United States Patent [19]
Payne et al.

[11] Patent Number: 6,155,747
[45] Date of Patent: Dec. 5, 2000

[54] MOBILE MODULAR WAREHOUSE STRUCTURE FOR CONTAINMENT AND HANDLING OF HAZARDOUS MATERIALS

[75] Inventors: Edward Payne, Fairfax, Va.; Paul C. Murphy, Mechanicsburg, Pa.; Philip J. Dunne, Houston, Tex.; Robert R. Elder, Annapolis; Emmett Gregory Sanford, Baltimore, both of Md.

[73] Assignee: The United States of America as represented by the Secretary of the Navy, Washington, D.C.

[21] Appl. No.: 09/226,267

[22] Filed: Jan. 7, 1999

[51] Int. Cl.[7] .................................................. B09B 3/00
[52] U.S. Cl. .......................... 405/128; 52/90.1; 588/259; 588/900; 588/249
[58] Field of Search ................... 52/90.1–93.2, 52/168, 263, 272; 405/52–55, 128, 129; 588/249, 259, 900; 196/24.1, 181, 187; 366/144, 348; 210/421

[56] References Cited

U.S. PATENT DOCUMENTS

| | | | |
|---|---|---|---|
| 3,336,069 | 8/1967 | Bayer et al. | 396/24.1 |
| 4,100,860 | 7/1978 | Gablin et al. | 588/259 X |
| 4,390,040 | 6/1983 | Beyen | 588/249 X |
| 5,009,511 | 4/1991 | Sarko et al. | 366/348 |
| 5,167,098 | 12/1992 | Blackwelder | 52/91.1 |
| 5,254,798 | 10/1993 | Zoback | 588/249 X |
| 5,300,137 | 4/1994 | Weyland, et al. | 405/128 |
| 5,356,206 | 10/1994 | Van Valkenburgh | 312/317.1 |
| 5,365,013 | 11/1994 | Aulson | 588/249 |
| 5,511,908 | 4/1996 | Van Valkenburgh et al. | |
| 5,735,639 | 4/1998 | Payne et al. | 405/128 |

Primary Examiner—Richard Chilcot
Attorney, Agent, or Firm—David Kalmbaugh

[57] ABSTRACT

A mobile modular warehouse structure for the storing and handling of containers of hazardous materials comprising a control point modular storage unit and a plurality of warehouse modular storage units. The modular storage units may be configured in a row to form one embodiment of the mobile modular warehouse structure. In this configuration access between the interiors of adjacent modular storage units is provided by a bellows which is connected to and removable from a bellows support frame in a side wall of each modular storage unit. The modular storage units may also be configured in a stacked arrangement to form an alternate embodiment of the modular mobile safety structure. In this configuration access between the interiors of the stacked modular storage units is provided through an opening between the control point modular storage unit and the warehouse modular storage unit stacked thereon. Stairs located in the control point modular storage unit allow the user to gain access to each unit in the stack. Each modular storage unit includes a secondary containment feature in the form of a base assembly having a containment pan. Each modular storage unit has a plurality of deflagration vents which burst open when pressure is applied. to the vents as the result of an accidental vapor or gas explosion.

20 Claims, 18 Drawing Sheets

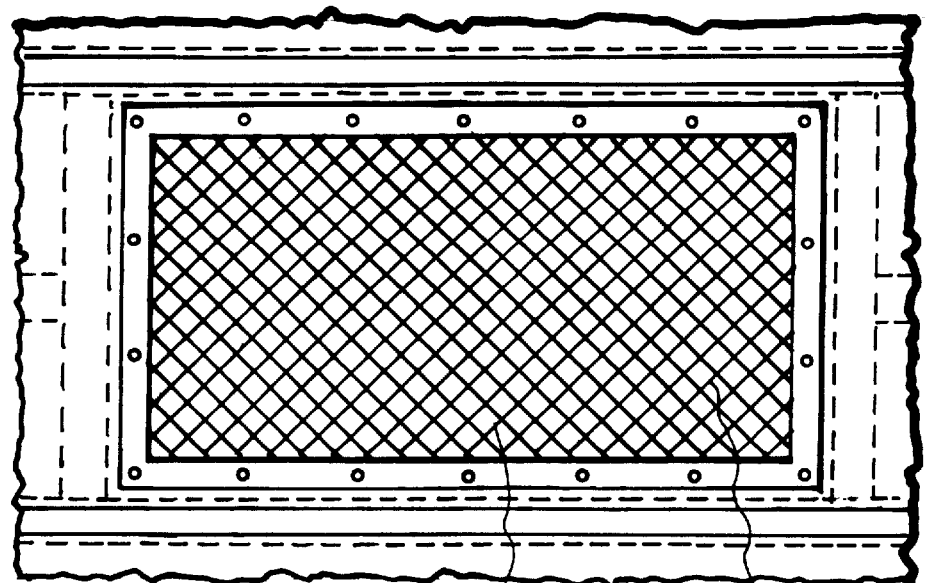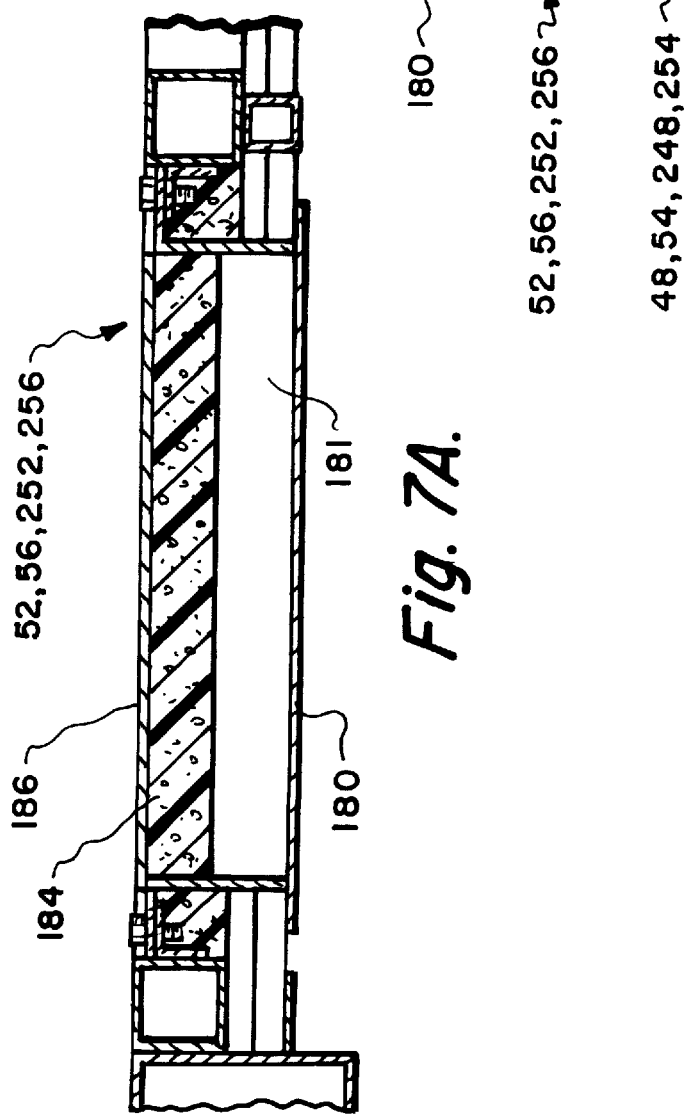

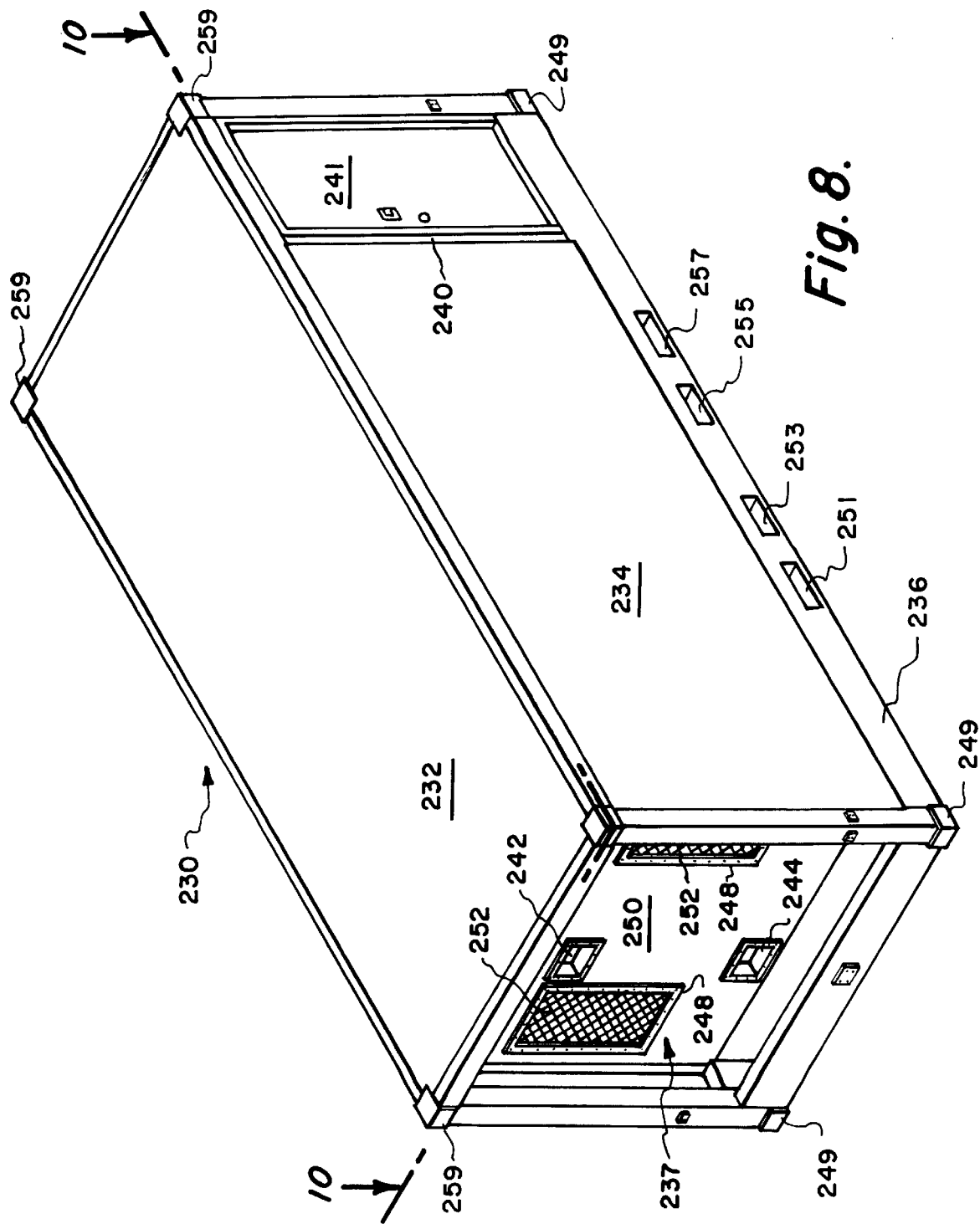

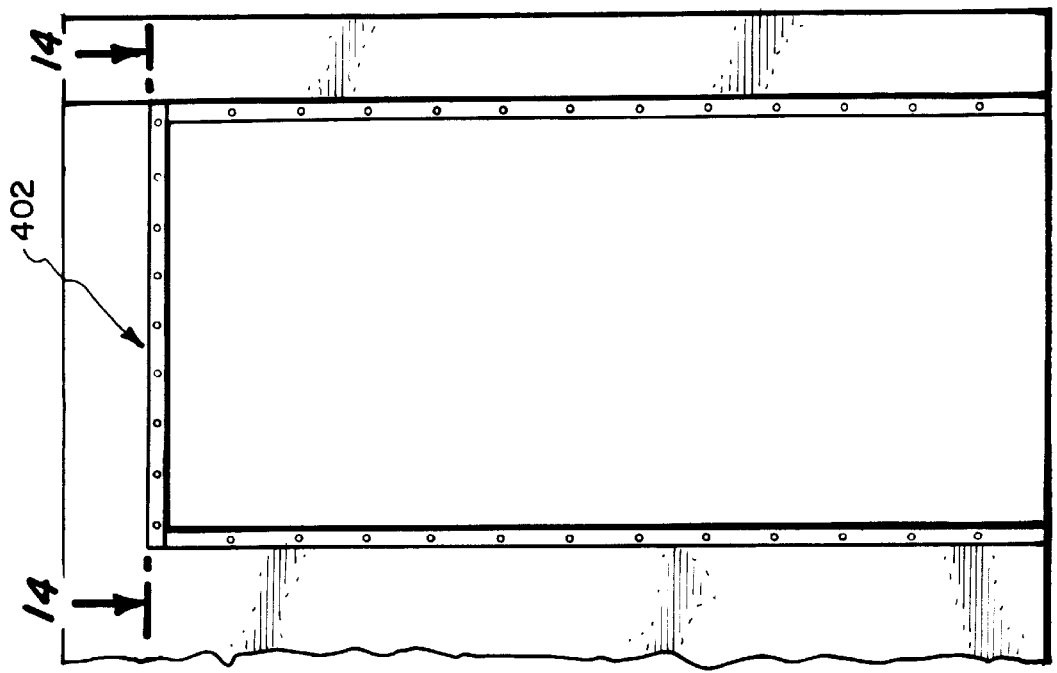
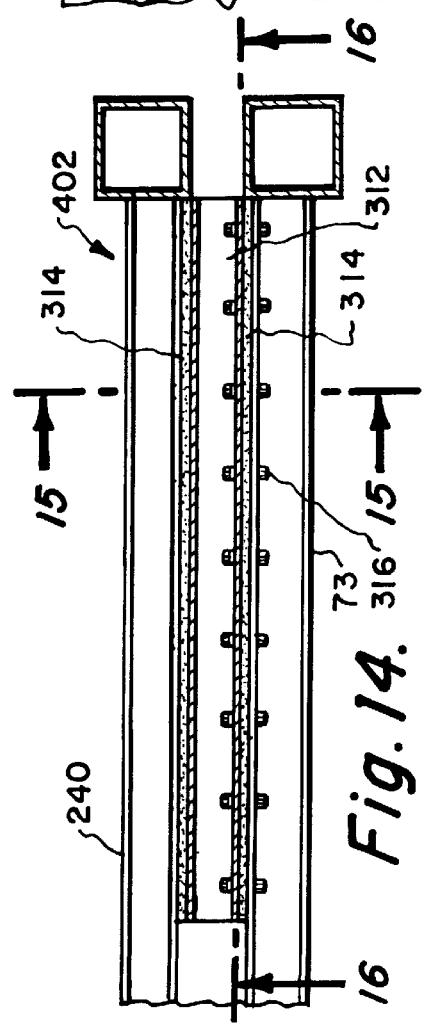
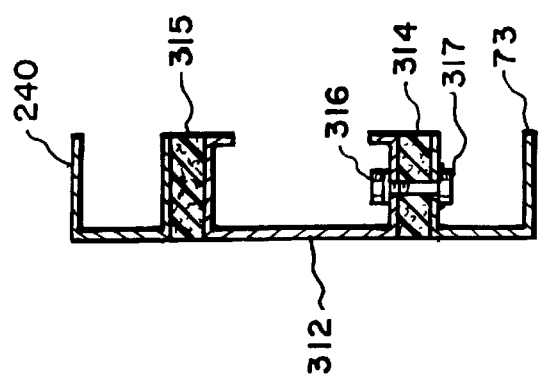
Fig. 16.
Fig. 14.
Fig. 15.

MOBILE MODULAR WAREHOUSE STRUCTURE FOR CONTAINMENT AND HANDLING OF HAZARDOUS MATERIALS

BACKGROUND OF THE INVENTION

1. Field of the Invention

This invention relates generally to the handling of hazardous wastes and other hazardous materials. More specifically, the present invention is concerned with a new form of mobile modular warehouse structure for the safe handling, distribution, and storing of hazardous materials.

2. Description of the Prior Art

The handling and storage of hazardous materials, and particularly hazardous waste has become a problem of major proportions. Increased emphasis is being placed on the importance of assuring that solvents, fuels lubricants, paint related products, and the like are stored with adequate safeguards. Increasingly, it is being recognized that even small spills and relatively minor leakages of the growing number of substances that are toxic and are referred to as "hazardous material" can detrimentally affect persons, property, plants, animals, ground water and other aspects of ecology and the environment. Moreover, in view of increasing concern about the lasting nature of the adverse effects that can result from spills and unchecked leakage of hazardous materials, the issue of storage and distribution of hazardous materials is receiving increasing attention by law-makers, by regulatory agencies, and by those who have been elected to govern and to enforce the laws and regulations relating to hazardous materials.

There is a genuine and real need for a well designed, heavy duty hazardous material containment facility that appropriately will address today's increasing concern for the way in which hazardous materials are handled and stored.

There is also a need for a hazardous material containment structure which allows the user to maintain an inventory of the hazardous materials being stored and maintained within the structure.

The above and other needs for a hazardous material containment structure were partially met by U.S. Pat. No. 5,511,908 which issued Apr. 30, 1996 to Norman S. Van Valkenburgh, Gary L. Van Valkenburgh and Edward Payne. U.S. Pat. No. 5,511,908 discloses a single self contained storage unit for the storing and handling of containers of hazardous materials which includes a secondary containment feature in the form of a base assembly having a containment pan. The base assembly of the storage unit also provides a framework for supporting a floor of removable grating which allows access to the containment pan. The storage unit further comprises front, rear and side walls and a roof of very sturdy construction employing interior and outer surface steel panels supported by a generally rectangular shaped tubular steel framework for each wall and the roof of the mobile safety structure. There is sandwiched between the interior and outer surface steel panels of each wall a pair of gypsum boards and R-19 insulation. The insulation allows the user of the storage unit of U.S. Pat. No. 5,511,908 to adapt the structure for use under varying climatic conditions, while the gypsum board provides the structure with at least a four hour fire rating. The framework of the storage unit has corner fittings to receive dual wheel casters and a tow bar which in combination allow a tow truck to move the safety structure from a first location to a second location.

In addition, U.S. Pat. No. 5,735,639, which issued Apr. 7, 1998 to Norman S. Van Valkenburgh, Gary L. Van Valkenburgh and Edward Payne discloses a mobile safety structure in which the self contained storage unit of U.S. Pat. No. 5,511,908 may be configured in tandem or a stacked arrangement comprising four self contained storage units. These arrangements allow for an increase in the handling and storage capacity by the mobile safety structure of hazardous materials and contaminants.

However, under certain conditions, such as the cleanup of a military installation having significant amounts of jet engine fuel, paints, corrosives and other toxic materials, there is requirement for a containment facility large enough to handle and safely store these hazardous materials, preferably a structure having the storage capacity of a warehouse. Since these facilities often cover several hundred square miles there is a need for a containment facility to be mobile allowing for its movement from one location to another location on the facility as conditions dictate.

Further, there is a need to provide for a relatively inexpensive and safe mobile hazardous material containment facility to keep cleanup cost under control while maintaining the safety and health of the personnel using the facility.

In addition, there is a need to provide a hazardous material containment facility for the containment and handling of hazardous materials which is compliant with various local, national and international standards relating thereto, such as the Occupational Safety and Health Administration standards, National Fire Protection Agency standards and the ISO (International Organization of Standards) 1496, 9000 and 14000 Series of International Standards.

SUMMARY OF THE INVENTION

The structure of the present invention addresses the foregoing and other needs of hazardous material storage and handling by providing an environmentally safe modular storage warehouse type facility comprising multiple modular storage units which will provide a good service life and under circumstances of reasonable use, can be moved inexpensively from site to site over the years as may be appropriate to address a series of different servicing needs.

The mobile modular warehouse structure for containment and handling of hazardous materials comprises a control point modular storage unit and a plurality of warehouse modular storage units. The modular storage units of the warehouse structure may be configured adjacent one another to form a row of modular storage units with the control point modular storage unit being located at one end of row to form one embodiment of the mobile modular warehouse structure. In this configuration access between the interiors of adjacent modular storage units is provided by doors protected from the environment by a bellows which is connected to and removable from a bellows support frame in a side wall of each unit.

The modular storage units may also be configured in a stacked arrangement to form an alternate embodiment of the the mobile modular warehouse structure. In this embodiment the modular storage units are stacked as well as placed in rows to form the modular mobile warehouse structure. Access between the interiors of the stacked modular storage units is provided through an opening between control point modular storage unit and the warehouse modular storage unit stacked on top of the control point modular storage unit. A stairs located within the control point modular storage unit allows the user to gain access to each warehouse modular storage unit in the stack.

Each control point and warehouse modular storage unit of the mobile modular warehouse structure of the present invention includes a base assembly having a containment pan, right side and left side walls, front and rear walls and a roof assembly. The right side wall of the control point modular storage unit has a pair of doors allowing for access to the interior of the structure by its user. The left side wall of each warehouse modular storage unit as well as the left side wall of the control point modular storage unit within the modular mobile warehouse structure has a bellows support frame which is positioned near the rear end of each wall to support the bellows joining adjacent units of the structure.

The base assembly of each modular storage unit has at each corner thereof a corner fitting which may receive wheel casters. The modular storage unit is also adapted to receive a tow bar which in combination with the wheel casters allows a tow truck to move the unit from a first location to a second location.

The roof assembly of each modular storage unit also has at each corner thereof a corner fitting. The corner fittings at each corner of the base and roof assembly of each modular storage unit may receive twistlock stackers which are used to connect stacked modular storage units when the modular storage units are in a stacked configuration.

A machinery compartment is located in the front end of each modular storage unit of the structure. The machinery compartment includes the electrical control and power distribution system for each modular storage unit. A fire suppression controller and fire suppression tank is located within the machinery compartment for use in fighting chemical fires which may occur within unit. The control point modular storage unit includes the air conditioning and heating unit for distributing heat and air conditioning within the modular storage units of the structure.

The control point modular storage unit and each warehouse modular storage unit of the mobile modular warehouse structure have a plurality of deflagration vents which burst open when pressure is applied to the vents as the result of an accidental vapor or gas explosion which occurs in the interior portion of control point modular storage unit or a warehouse modular storage unit of the mobile modular warehouse structure.

A better understanding of the mobile modular warehouse structure comprising the present invention as well as a better recognition of its advantages and novel features will be afforded to those skilled in the art from a consideration of the following detailed description of the a preferred embodiment thereof.

BRIEF DESCRIPTION OF THE DRAWINGS

FIG. 7A is view, in section, taken along line 7A—7A of FIG. 2 which illustrates a deflagration vent used in the mobile modular warehouse structure constituting the present invention;

FIG. 7B illustrates an interior view of the deflagration vent of FIG. 7A;

FIG. 8 is a perspective view of the warehouse modular storage unit of the mobile modular warehouse structure that constitutes the other modular element of the preferred embodiment of the present invention;

FIGS. 14–16 illustrate various views of the door seal for the doors of the control point modular storage unit of FIG. 1 and the warehouse modular storage unit of FIG. 9;

DETAILED DESCRIPTION OF THE PREFERRED EMBODIMENT

Figure 1:
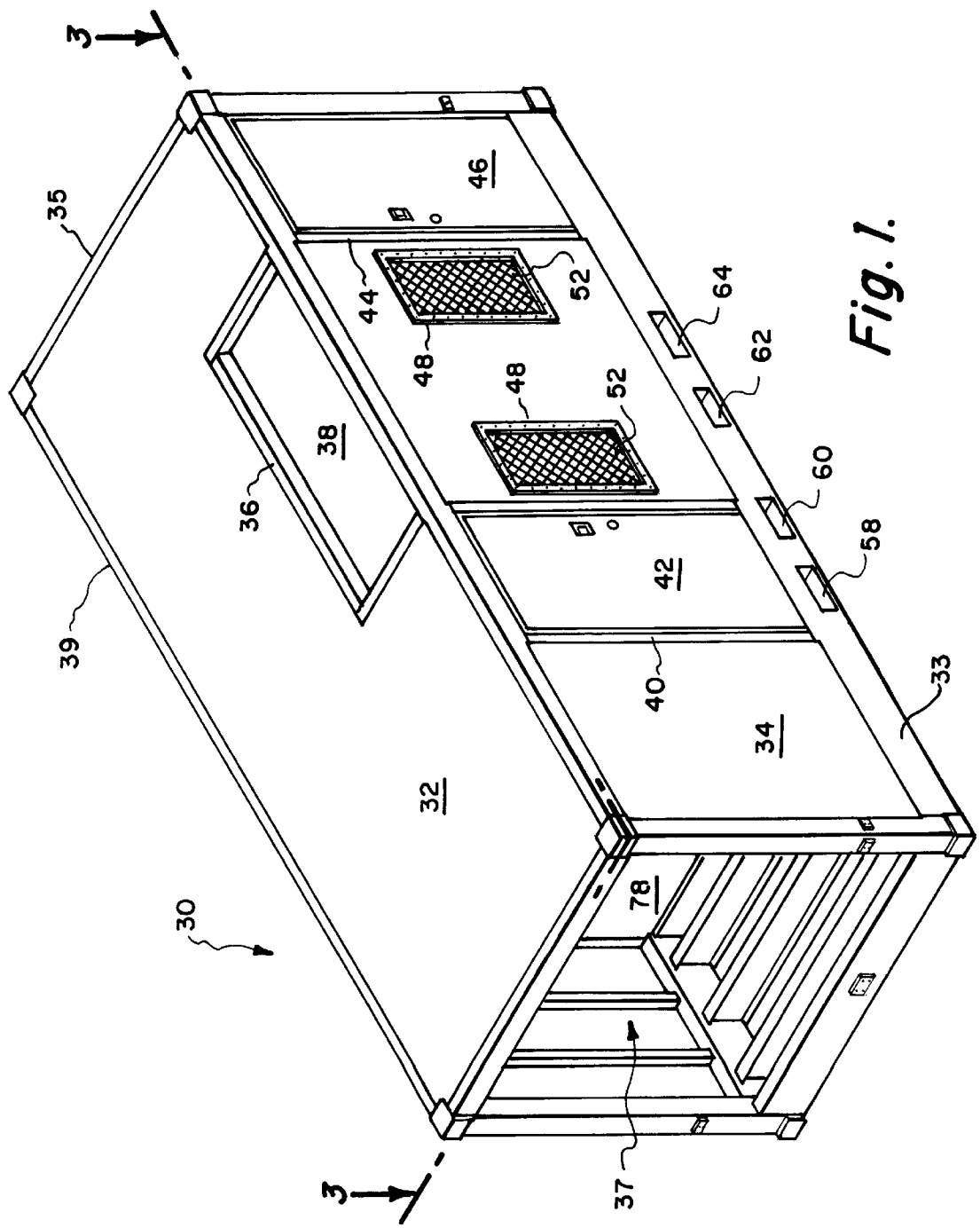
FIG. 1 is a perspective view of the control point modular storage unit of the mobile modular warehouse structure that constitutes one modular element of the preferred embodiment of the present invention.
Figure 2:
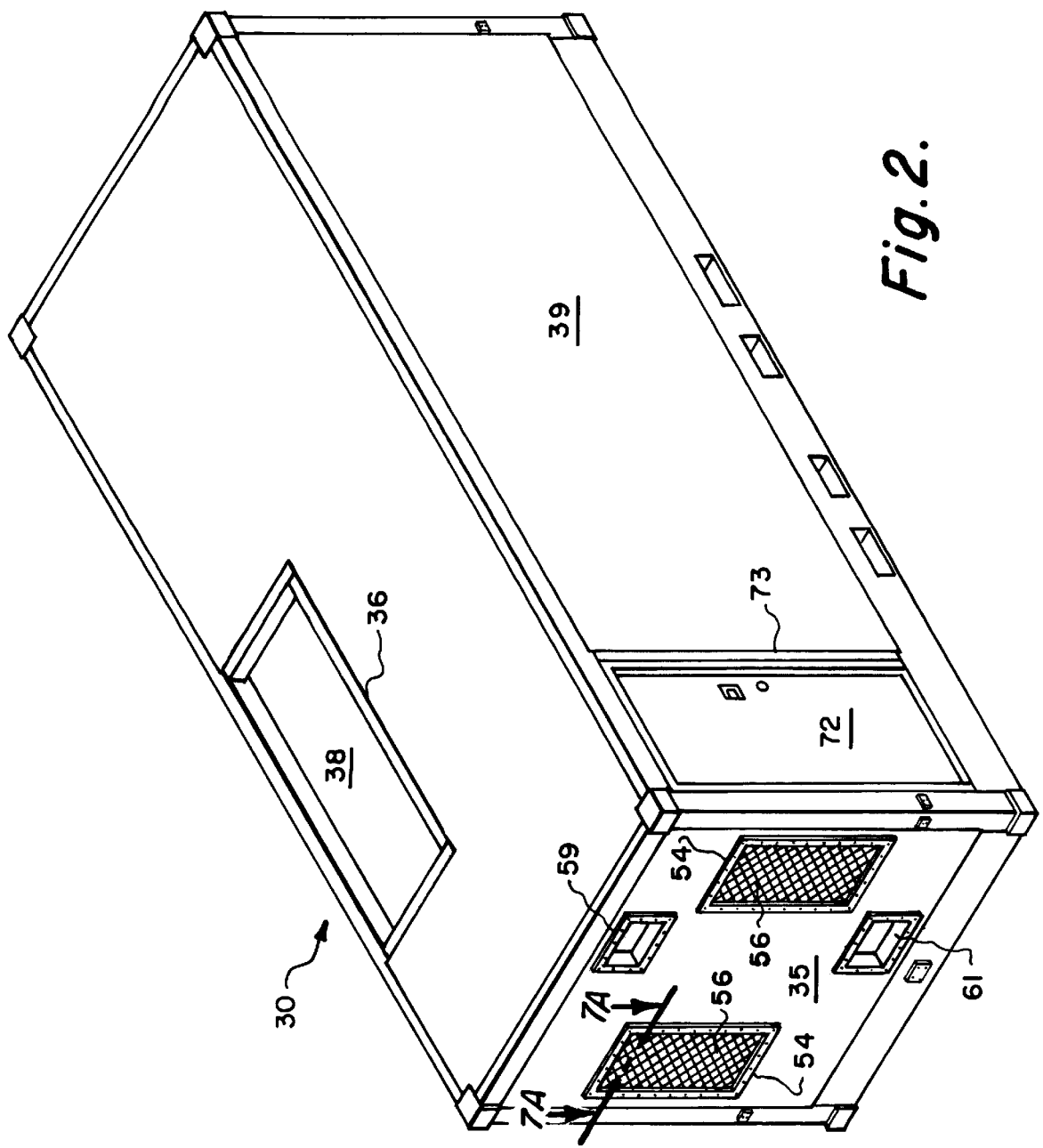
FIG. 2 is an alternate perspective view of the control point modular storage unit of FIG. 1.

Referring to FIGS. 1 and 2, there is shown a "control point modular storage unit" or "hazardous material containment structure" that represents a component or module of the mobile modular warehouse structure comprising the present invention. The control point modular storage unit is, in turn, designated generally by the reference numeral 30. Control point modular storage unit 30 has the general shape of a rectangular box like structure and has overall length, width, height dimensions of approximately 20 feet by 8 feet by 8 feet.

Figure 9:
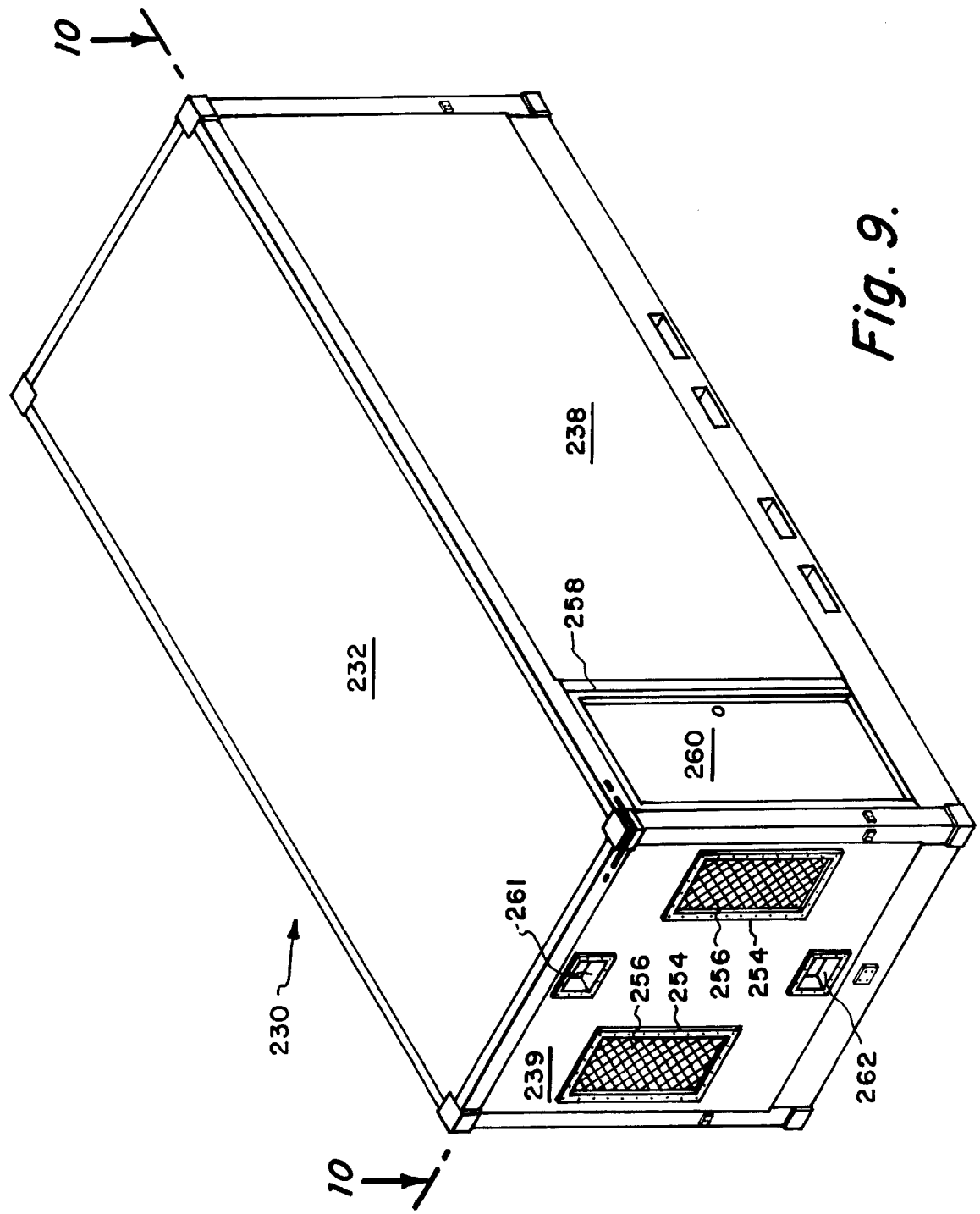
FIG. 9 is an alternate perspective view of the warehouse modular storage unit of FIG. 8.

Referring to FIG. 9, there is shown a "warehouse modular storage unit" or "hazardous material containment structure" that represents the other component or module of the mobile modular warehouse structure comprising the present invention. The warehouse modular storage unit is, in turn, designated generally by the reference numeral 230. Warehouse modular storage unit 230 also has the general shape of a rectangular box like structure and has overall length, width, height dimensions of approximately 20 feet by 8 feet by 8 feet.

Figure 18:
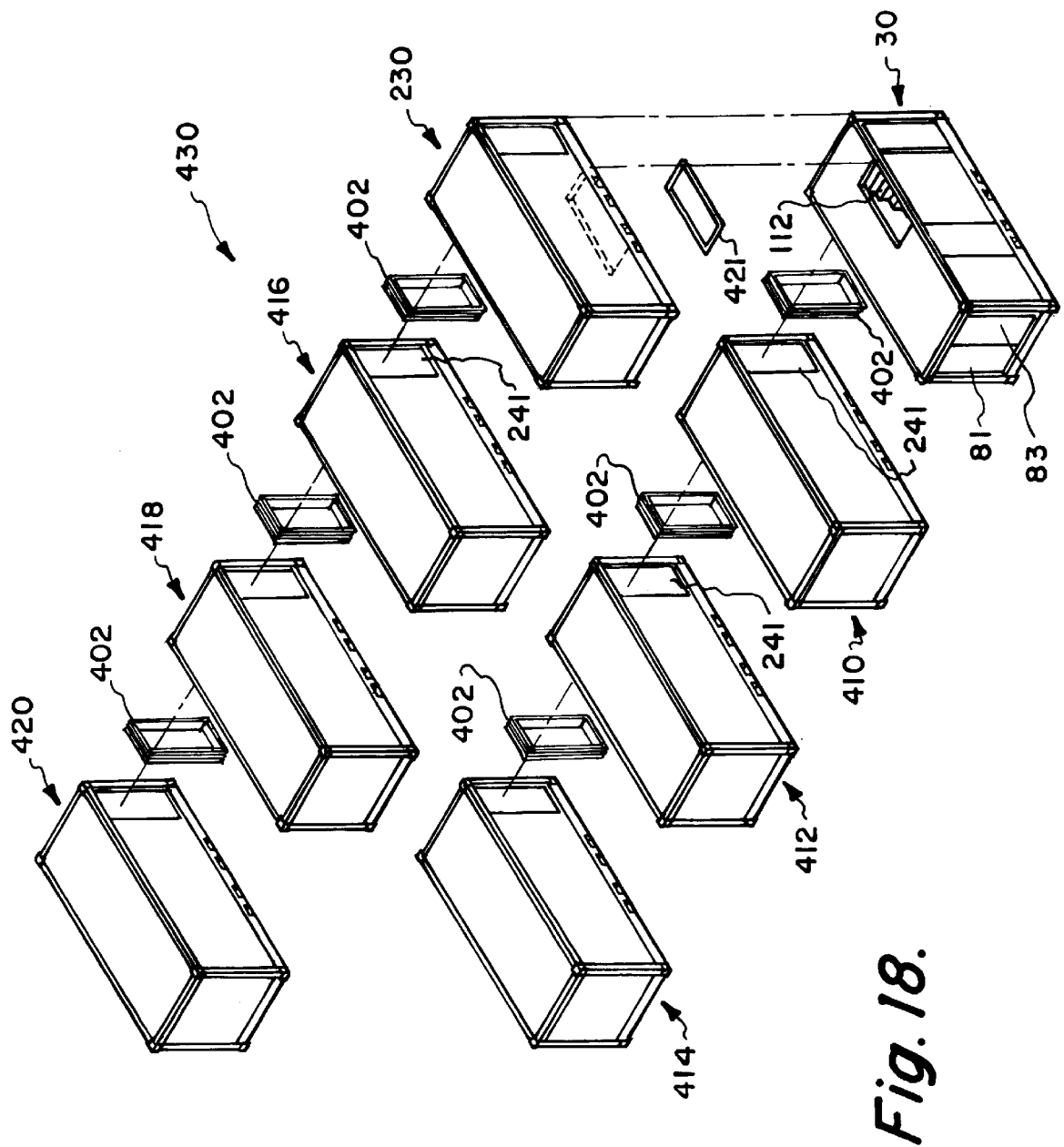
FIG. 18 is an exploded isometric view of an embodiment of the mobile modular warehouse structure comprising the present invention which includes the control point modular storage unit of FIG. 1 and multiple warehouse modular storage units of type illustrated in FIG. 9.
Figure 19:
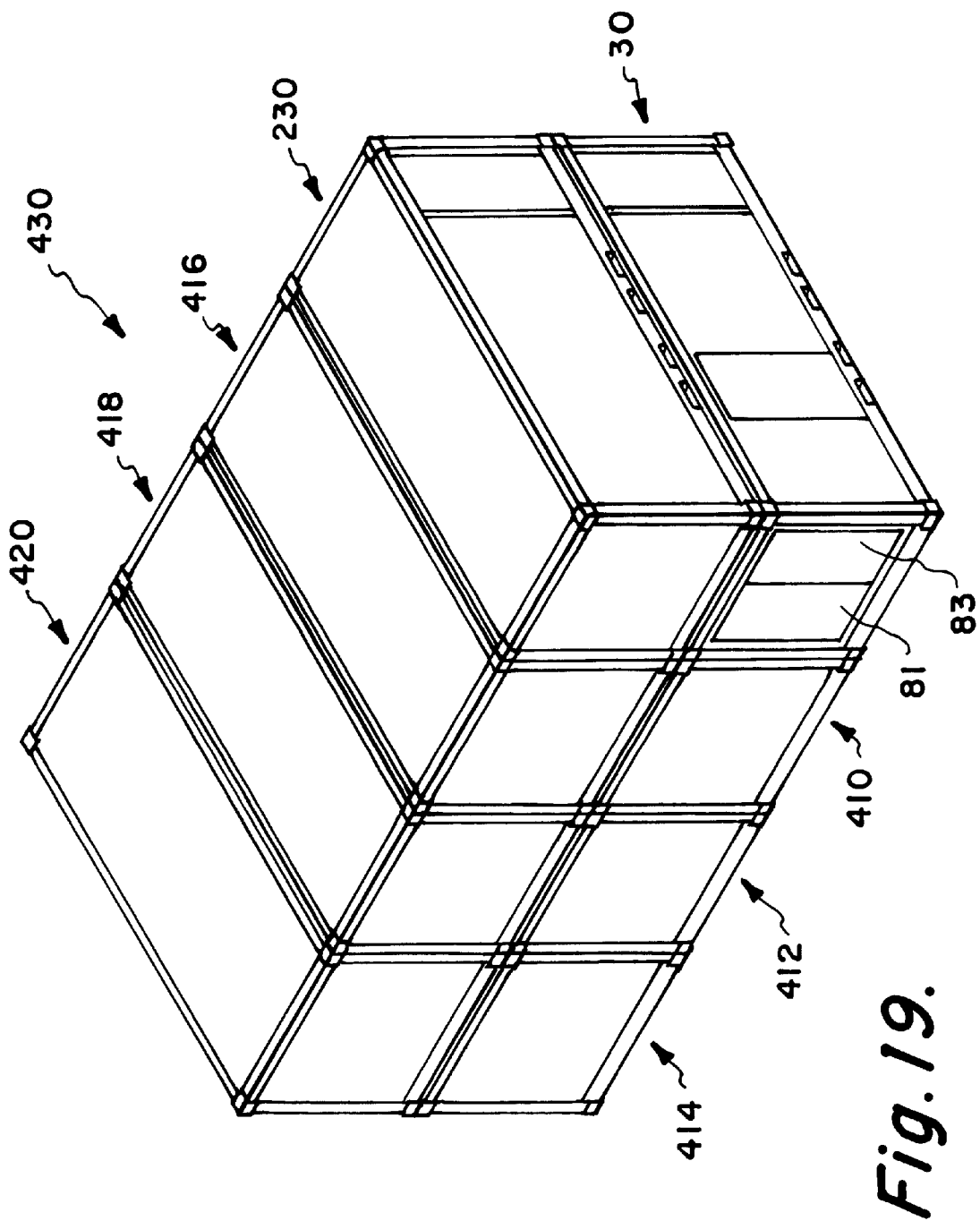
FIG. 19 is a perspective view of an embodiment of the mobile modular warehouse structure of the present invention in a stacked arrangement.

Referring now to FIGS. 18, and 19, one embodiment of the mobile modular warehouse structure (designated generally by the reference numeral 430 in FIG. 18) includes a control point modular storage unit 30 and multiple warehouse modular storage units 230, 410, 412, 414, 416, 418 and 420. In this embodiment modular storage units 30, 410, 412 and 414 form the bottom portion of the mobile modular warehouse structure 430, while the modular storage units 230, 416, 418 and 420 form the top portion of the mobile modular warehouse structure 430.

Figure 20:
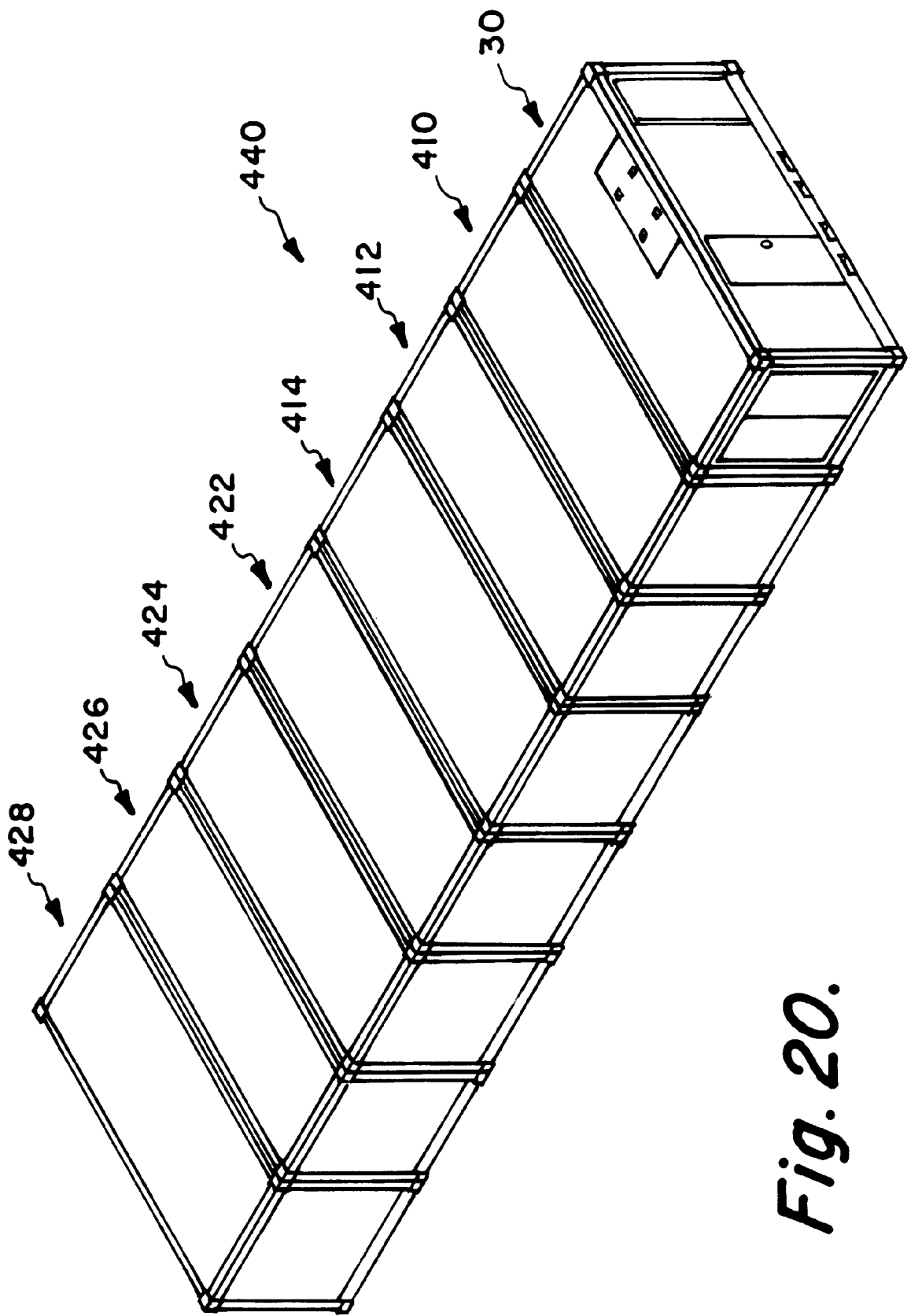
FIG. 20 is an perspective view illustrating another embodiment of the mobile modular warehouse structure of the present invention in a side by side arrangement.

Referring now to FIG. 20, an alternative embodiment of the mobile modular warehouse structure, designated generally by the reference numeral 440. In this embodiment, the control point modular storage unit 30 is positioned at the front of structure 440 with the warehouse modular storage units 410, 412, 414, 422, 424, 426 and 428 being positioned behind unit 30 in the manner illustrated in FIG. 20 to form mobile modular warehouse structure 440.

Figure 3:
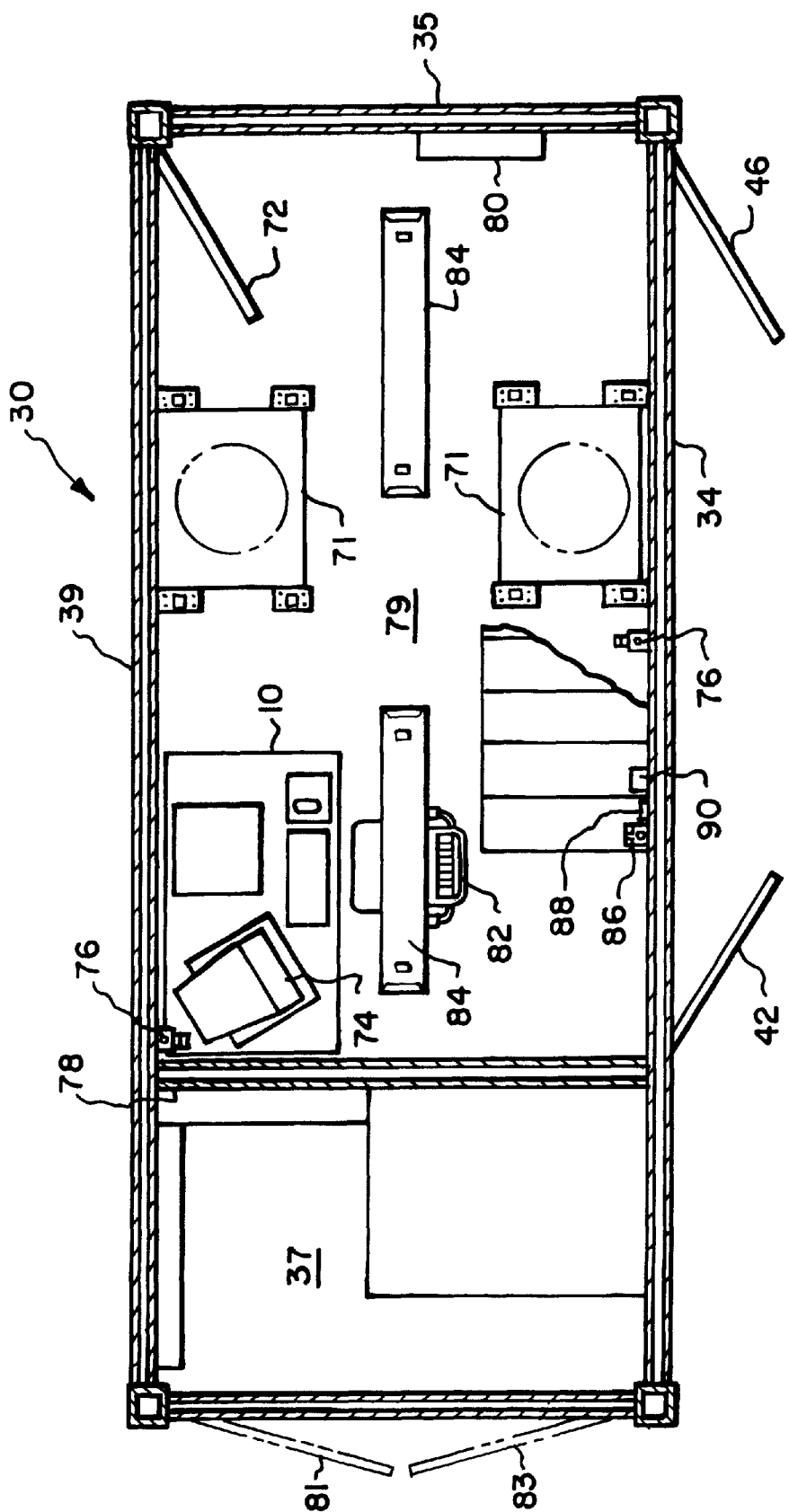
FIG. 3 is an interior view of the control point modular storage unit of FIG. 1 taken along plain 3—3 of FIG. 1.

Referring now to FIGS. 1, 2 and 3, in overview, the control point modular storage unit 30 has a base assembly 33 (FIG. 1) or skid and an assembly of upstanding walls that is supported on base assembly 33. Unit 30 also includes a roof assembly 32, that is supported atop the rectangularly shaped assembly of upstanding walls.

The assembly of upstanding walls consist of a right side wall 34, a left side wall 39, an interior wall 78 positioned toward the front of unit 30 and a rear wall 35. A pair of door frame assemblies 40 and 44 are incorporated into right side wall 34 and pivotally mount doors 42 and 46, respectively, which partially control access to the interior 79 of unit 30 from outside of unit 30. Similarly, a door frame assembly 73 is incorporated into left side wall 39 and pivotally mounts a door 72, which also partially controls access to the interior 79 of an adjacent warehouse modular storage unit.

A pair of deflagration vent support frames 48 and their associated deflagration vents 52 are incorporated in right side wall 34 between door frames 40 and 44. There is also a pair of deflagration vent support frames 54 and their associated deflagration vents 56 incorporated in rear wall 35 of control point modular storage unit 30.

Deflagration vents 52 and 56 will burst open when pressure is applied to the vents 52 and 56 as the result of an accidental vapor or gas explosion which occurs in the interior portion 79 of control point modular storage unit 30. For example, a hazardous chemical may be stored in the interior 79 of unit 30, a gas leak may occur from a rupture in a stored container within interior 79 and an electrical spark could then ignite the gaseous fumes resulting in an explosion in the interior portion of unit 30. The pressure generated from the explosion causes the vents 52 and 56 to burst open releasing combustion waves, toxic gases, etc. into the atmosphere.

There is also a pair of exhaust vents 59 and 61 incorporated in the rear wall 35 of unit 30. Exhaust vents 59 and 61 are used to expel contaminated air and fumes from airborne contaminants within the interior portion 79 of unit 30.

The base assembly 33 of control point modular storage unit 30 has a four elongated slots 58, 60, 62 and 64 which run the width of unit 30. The pair of slots 60 and 62 are positioned about the center of base assembly 32 and are positioned to receive the forks of a fork lift truck (not illustrated). Similarly, the pair of slots 58 and 64 are also positioned about the center of base assembly 32 and are positioned to receive the forks of a larger fork lift truck (not illustrated). Placing the pair of slots 60 and 62 as well as the pair of slots 58 and 64 about the center point of unit 30 insures that a balance load occurs on the forks of a fork lift truck when the fork lift truck moves unit 30 from a first location to a second location.

Figure 4:
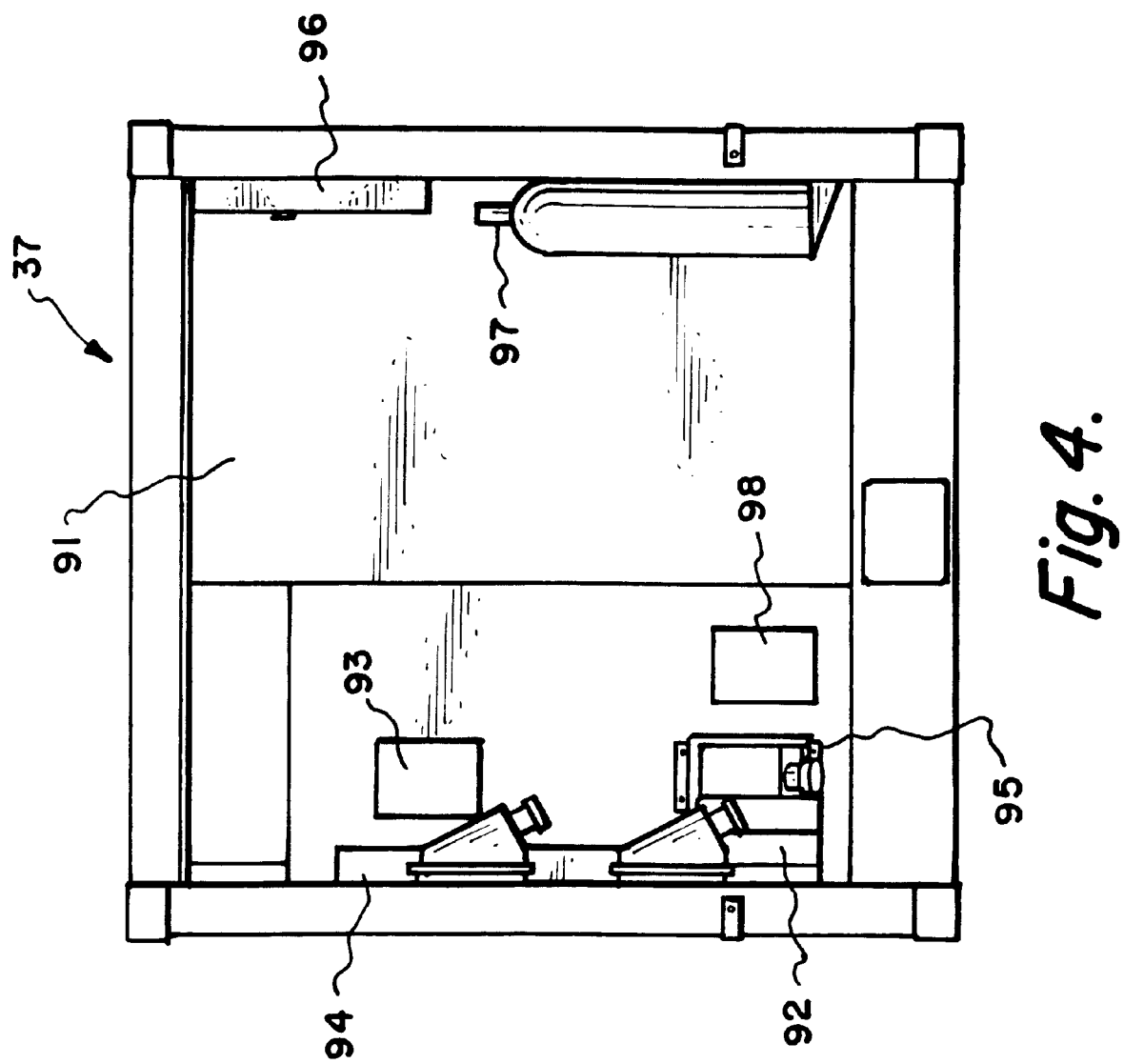
FIG. 4 is an interior view of the machinery compartment of the control point modular storage unit of FIG. 1.

Referring to FIGS. 3 and 4, the forward portion of control point modular storage unit 30 has a machinery room or compartment 37 which is enclosed by interior wall 78, the front portion of right side wall 34 and left side wall 79 and a pair of machinery room access doors 81 and 83 which allow the user of unit 30 to access machinery compartment 37. Machinery compartment 37 includes an air conditioner and heater unit 91 for cooling and heating the interior 79 of unit 30 as well as the interior of each of the warehouse modular storage units comprising the mobile modular warehouse structure of the present invention. Machinery compartment 37 also includes a 240/220/110 volt transformer 92, a lighting contactor 93, an electrical panel board 94, a 240 volt receptacle and a bell which comprises the electrical control and power distribution system for unit 10. A fire suppression controller 96 and fire suppression tank 97 are also located within compartment 37 for use in fighting chemical fires which may occur within unit 10.

There is located in the interior 78 of control point modular storage unit 30 a computer work station which includes a computer and its associated monitor 74 supported on work station desk 10 and a chair 82 for the user of the computer work station. Computer and its associated monitor 74 may be any conventional IBM compatible personal computer which is used to keep a detailed record of the hazardous materials and contaminants stored in control point modular storage unit 30 and each of the warehouse modular storage unit 230 which comprises the mobile modular warehouse structure.

Shelving 71 is provided for storage of hazmat containers within the interior of unit 30. There is also a pair of florescent light fixtures 84 located in the interior portion 79 of unit 30 for providing illumination to the interior portion 79 of unit 30. Mounted on the interior of right side wall 34 is a light switch 86 for activating florescent light fixtures 84, a manual pull box 88 for fire suppression system activation and a thermostat 90 for setting and monitoring the temperature within the interior 79 of unit 30. Mounted on left side wall 39 and right side wall 34 of unit 30 are a pair of convenience receptacles 76.

Figure 5:
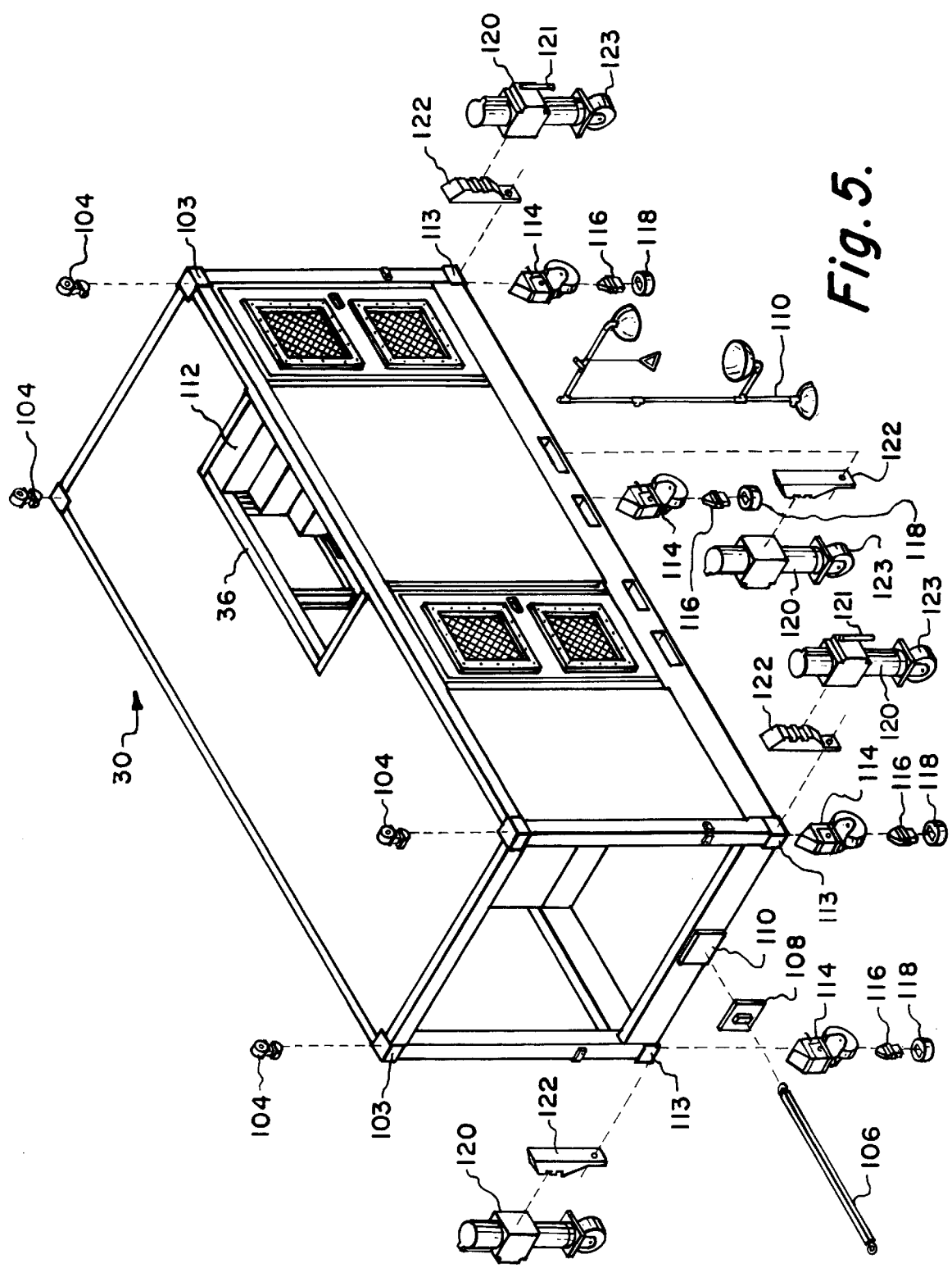
FIG. 5 is a perspective view illustrating various external components affixed to exterior of the control point modular storage unit of FIG. 1.

Referring to FIGS. 1 and 5, base assembly 33 of control point modular storage unit 30 includes four ISO corner fittings/wheel support assembles 113 with one corner fitting 113 being positioned at each corner of base assembly 33. Each corner fitting 113 may receive a swivel wheel container caster 114 which, when secured to unit 30 allows unit 30 to be moved from one location to another location within, for example, a warehouse.

The roof assembly 32 of control point modular storage unit 30 includes four ISO corner fittings 103 with one corner fitting 103 being positioned at each corner of roof assembly 32. Each corner fitting 103 may receive a container lifting lug/eyelet 104 which allows a cable (not illustrated) to be attached thereto. When cables are attached to the lifting lugs 104 at each corner of unit 30, a crane (not illustrated) may be used to remove unit 30 from a fixed location and load unit 30 on a flatbed trailer for transportation to a new contamination site. A truck having the flatbed trailer attached thereto is used to transport unit 30 to the new contamination site where unit 30 will be used to clean up the site.

A jack assembly adapter plate 122 may be attached to each corner of control point modular storage unit 30 directly into and above each corner fitting 113 of unit 30. Each jack assembly adapter plate 122 is adapted to couple a jack assembly 120 to unit 30. Each jack assembly 120 includes a handle 121 which allows the user of control point modular storage unit 30 to raise and lower unit 30 and a wheel 123 which allows unit 30 to be moved from one location to another location.

It should be noted that the base assembly 33 attached to the front end thereof a tow bar plate 110 and pintle hook 108 capable of securing a tow bar 106 to control point modular storage unit 30 allowing unit 30 to be towed by a tow truck from one location to another location.

In addition, it should be noted that a combination drench shower and eyewash station 110 can be mounted on the right side wall 34 of control point modular storage unit 30. The drench shower and eyewash station 110 may be used to remove contaminants and hazardous materials from the body and eyes of individuals working within the control point modular storage unit 30 or any of the warehouse modular storage units of the mobile modular warehouse structure which constitutes the present invention.

Figure 6:
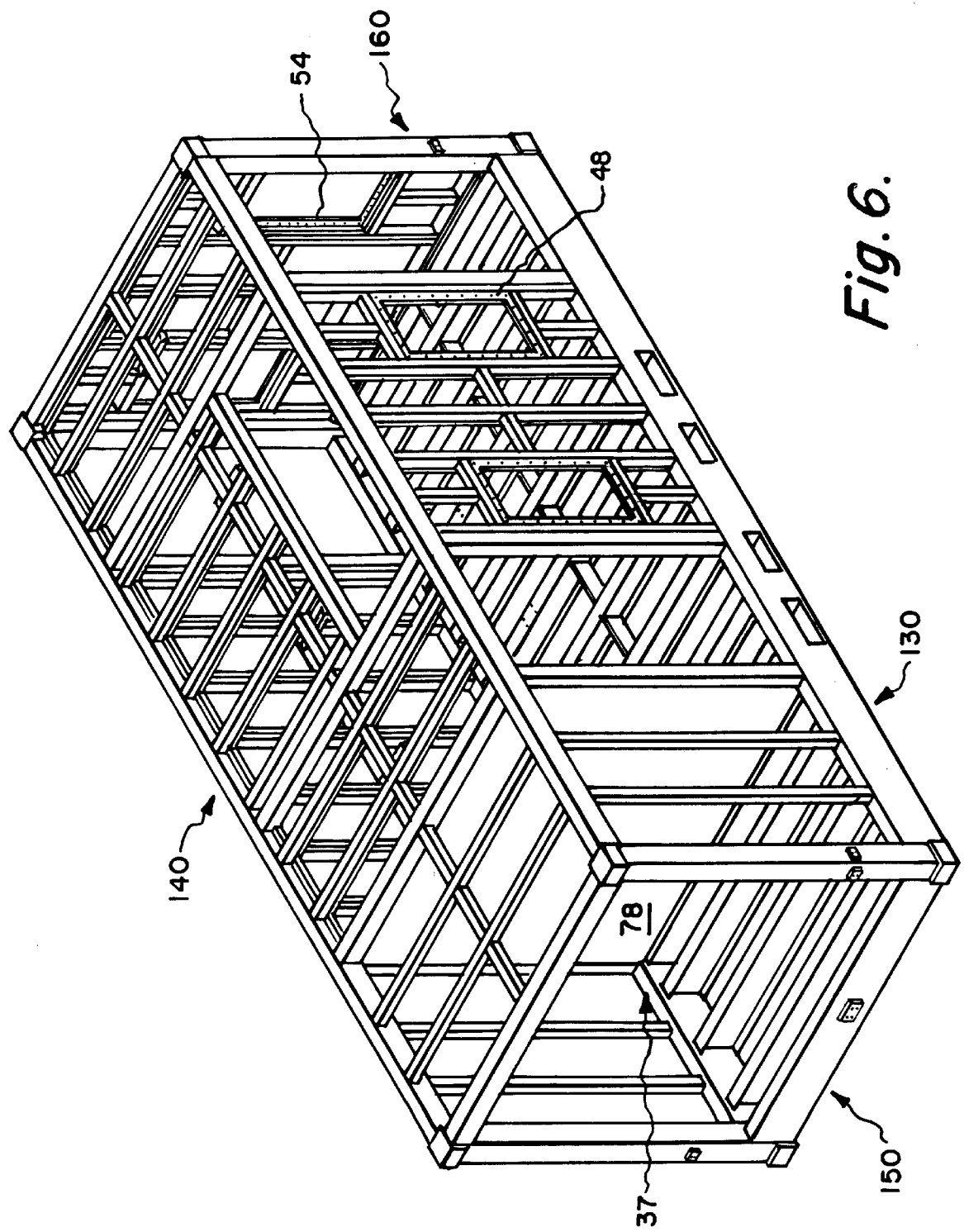
FIG. 6 is an isometric view of the framework for the control point modular storage unit of FIG. 1.

Referring to FIGS. 1, 2 and 6, the rectangular shaped framework or support structure (illustrated in FIG. 6) for unit 30 is similar to the support structure of the modular mobile safety structure disclosed in U.S. Pat. No. 5,735,639 and the mobile safety structure illustrated in U.S. Pat. No. 5,511,908. For example, the right side wall structure 160 of unit 30 is similar to the right side wall structure of the mobile safety structures of U.S. Pat. Nos. 5,511,639 and 5,735,639 except for the addition of door frames 40 and 44 and deflagration vent support frames 48. In a like manner, the base assembly structure 130 and the roof assembly structure 140 are almost identical to the base assembly and roof assembly structures of the mobile safety structures of U.S. Pat. Nos. 5,511,639 and 5,735,639.

Although not illustrated, the outer walls 34, 35 and 39 and the roof 32 of control point modular storage unit 30 provide for a strong structural enclosure by using interior and outer surface steel panels supported by the generally rectangular shaped tubular steel framework (illustrated in FIG. 6) for each outer wall 34, 35 and 39 and the roof 32 of the modular storage unit 30. There is sandwiched between the interior and outer surface steel panels of each wall a pair of gypsum boards and R-19 insulation. The insulation allows the user of mobile modular warehouse structure to adapt the structure for use under varying climatic conditions, while the gypsum board provides the structure with at least a four hour fire rating. Inner wall 78 may be fabricated in a like manner to provide for a four hour fire rating.

Figure 10:
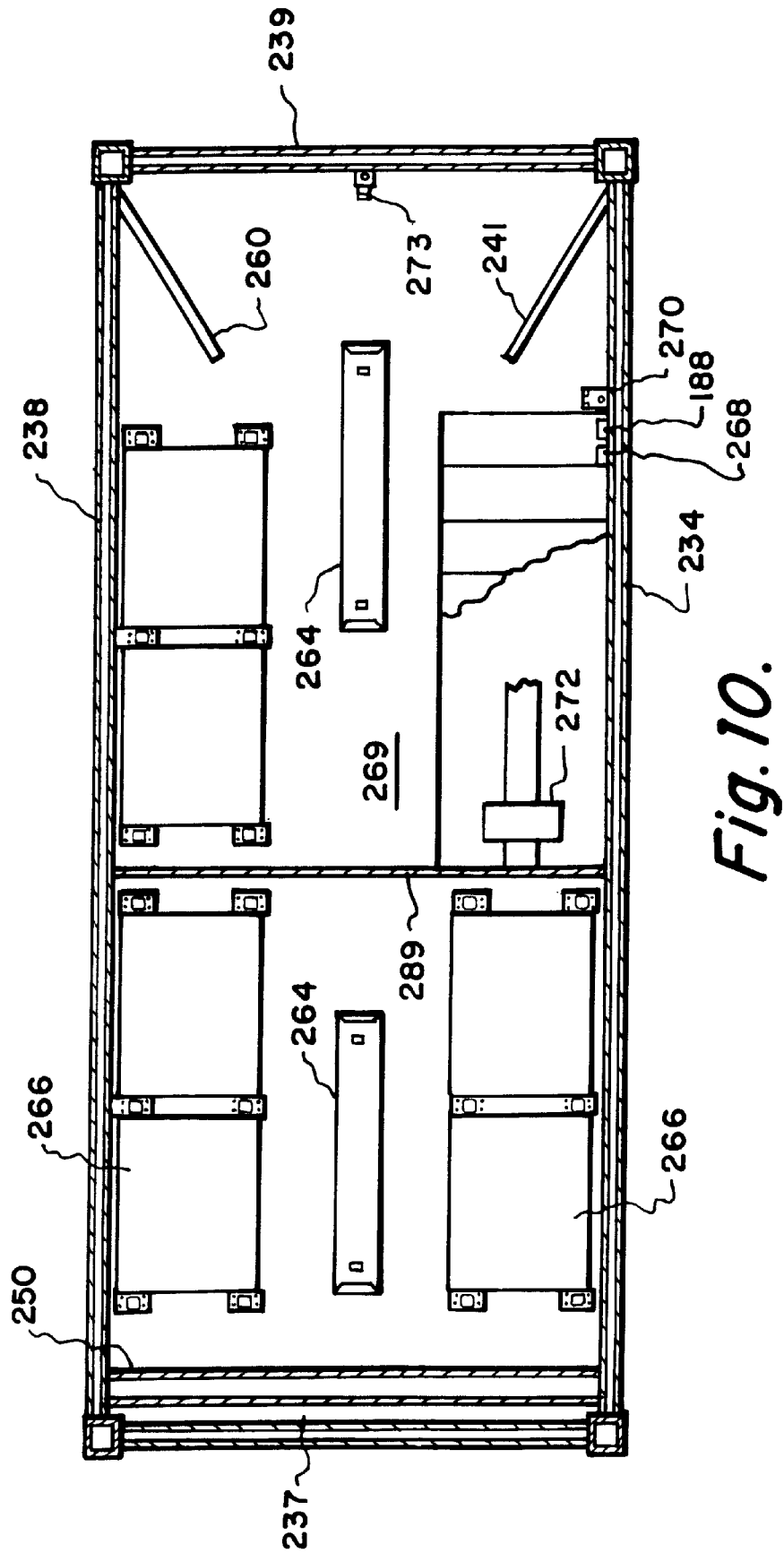
FIG. 10 is an interior view of the warehouse modular storage unit of FIG. 8 taken along plain 10—10 of FIG. 8.

Referring now to FIGS. 8, 9 and 10, in overview, the warehouse modular storage unit 230 has a base assembly 236 (FIG. 8) or skid and an assembly of upstanding walls that is supported on base assembly 236. Unit 230 also includes a roof assembly 232, that is supported atop the rectangularly shaped assembly of upstanding walls.

The assembly of upstanding walls consist of a right side wall 234, a left side wall 238, an interior wall 250 positioned near the front of unit 230 and a rear wall 239. A door frame assembly 240 is incorporated into right side wall 234 at the rear end of wall 234 and pivotally mounts door 241 which controls access to the interior 269 of unit 230. Similarly, a door frame assembly 258 is incorporated into left side wall 238 at the rear end of wall 238 and pivotally mounts a door 260, which also controls access to the interior 269 of unit 230.

It should be noted that 241 and 260 are placed adjacent each other in unit 230 to allow a user to access each warehouse modular storage unit from an adjacent unit. Access between the interiors of adjacent modular storage units is protected from the environment by a bellows which is connected to and removable from a bellows support frame in the left side wall of each unit. For example, as is best illustrated in FIGS. 8, 9, 18 and 19, a user can pass from unit 230 through a bellows 402 to unit 416 by exiting door 260 of unit 230 and then passing through bellows 402 and door 241 of unit 416 to the interior 269 of unit 416. In a like manner, door 72 (FIG. 2) of unit 30 is aligned with door 241 of any of the warehouse modular storage units 230 and 410-420 illustrated in FIG. 18.

This allows access between control point modular storage unit 30 and the warehouse modular storage unit 410 placed adjacent to unit 30 in the mobile modular warehouse structure 430 illustrated in FIG. 18.

Figure 12:
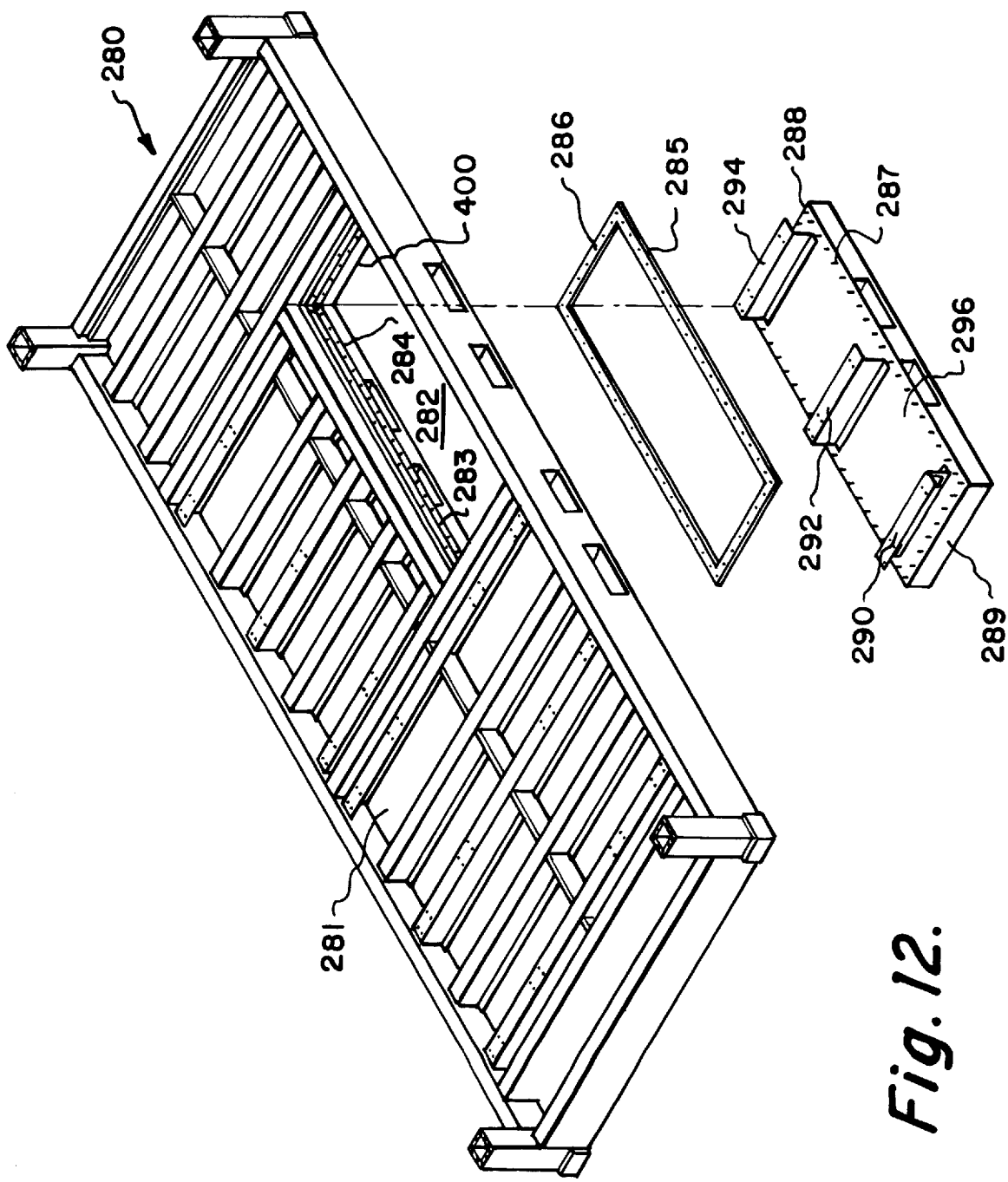
FIG. 12 is an isometric view of the base assembly of the warehouse modular storage unit of FIG. 9 which includes an opening for access to the control point modular storage unit of FIG. 1.
Figure 13:
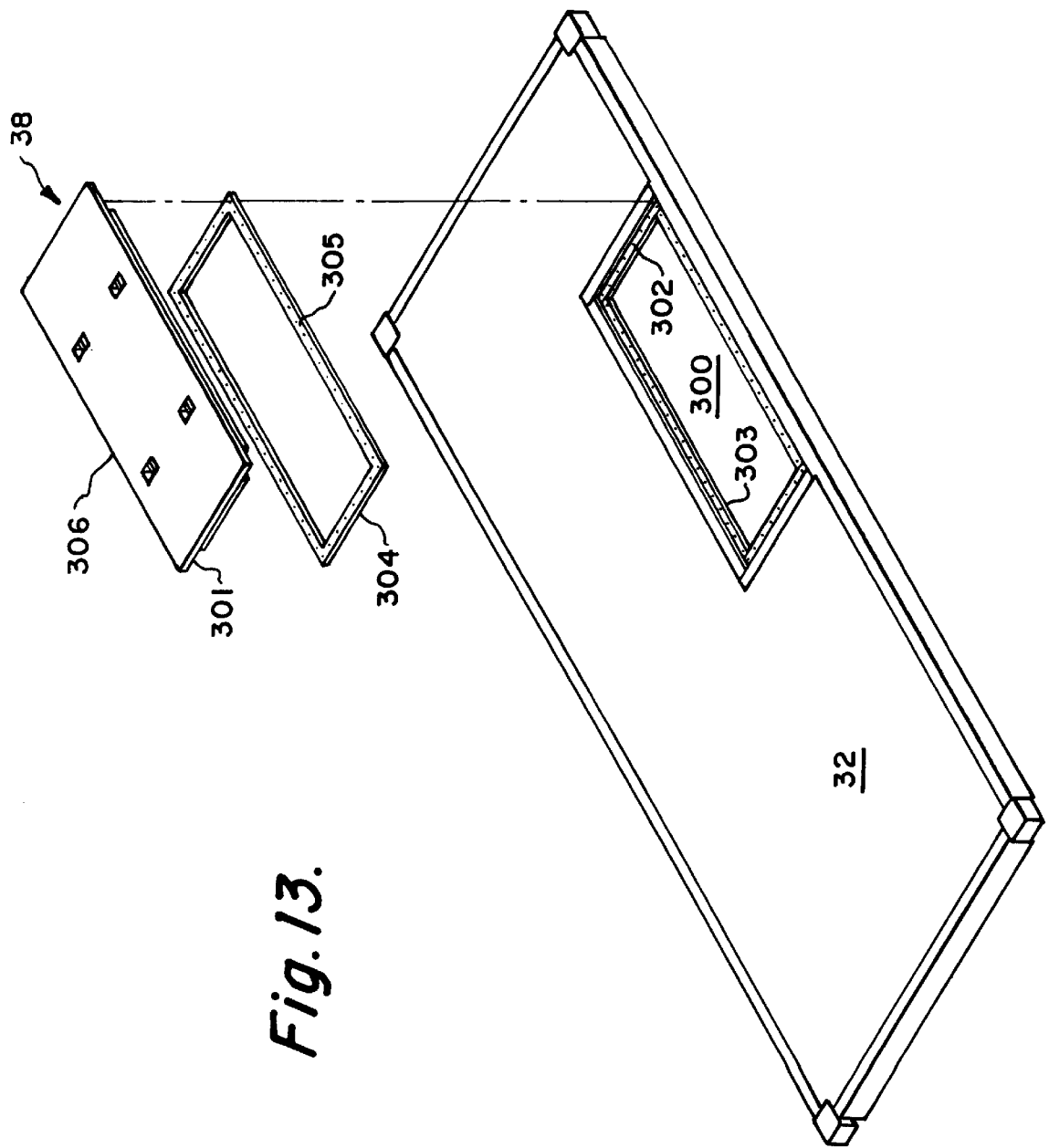
FIG. 13 is an isometric view of the roof assembly of the control point modular storage unit of FIG. 1 which includes an opening for access to the warehouse modular storage unit of FIG. 9.

To allow a user of mobile modular warehouse structure 430 to access any of the warehouse modular storage units 230, 416, 418 and 420 comprising the upper tier of structure 430, a flight of steps or stairs 112 and its associated support frame 36 are incorporated into unit 30. As depicted in FIGS. 12, 13 and 18, warehouse modular storage unit 230 has a rectangular shaped access/containment wall 400 aligned with an opening 282 in its base assembly and hazardous material containment structure 280. Rectangular shaped access wall 400 is also aligned with an opening 300 in the roof assembly 32 of control point modular storage unit 30. Rectangular shaped access wall 400 prevents hazardous materials in the hazardous material containment pan 281 of unit 230 from leaking through opening 282 into unit 30. Passageways 282 and 300 and stairs 112, in turn, allows the user of mobile modular warehouse structure 430 to access any of the warehouse modular storage units 230, 416, 418 and 420 from unit 30. An interface fitting 421 (FIG. 18) provides for a fire and environmental seal between units 30 and 230.

At this time it should be noted that. a removable fiberglass or the like grating is also included in each modular storage unit 30 and 230 which rest atop the base assembly containment pan 281. The removable grating allows the user of the structure to remove hazardous materials from the containment pan 281 by use of, for example, a pump. The removable grating also allows the user of each modular storage unit 30, 230 and 410-420 to visually inspect the interior of the containment pan for hazardous materials which may be contained therein.

Referring to FIGS. 12 and 18, there is shown stair plug 288 which fits within opening 282 of base assembly and hazardous material containment structure 280 to seal structure 280 when unit 230 (FIG. 8) is not being used with the stairs 112 of unit 30 to access unit 230 from unit 30. Stair plug 288 includes a top plate 296 which is attached to the rectangular shaped frame 289 of stair plug 288 by means of a weld or the like. Mounted on plate 296 of stair plug 288 are three L shaped support members 290, 292 and 294 which provide support for the floor grating (not illustrated) placed on top of base assembly and hazardous material containment structure 280. There is also provided a gasket 285 having a top surface which fits snugly against the underside of stair plug support structure 284 to seal stair plug 288 within structure 280.

Stair plug support structure 284 has a plurality of apertures 283 which align the apertures 286 of gasket 285 and the apertures 287 of stair plug 288. The aligned apertures 283, 286 and 287 are adapted to receive bolts or screws to secure stair plug 288 and gasket 285 to stair plug support structure 284.

Referring to FIGS. 13 and 18, there is shown stair plug 306 which fits within opening 300 of roof assembly 32 of unit 30 to seal roof assembly 32 when unit 30 (FIG. 1) is not being use with the stairs 112 of unit 30 to access unit 230 from unit 30. There is provided a gasket 304 which fits snugly against stair plug support structure 303 to seal stair plug 306 within roof assembly 32.

Stair plug support structure 303 has a plurality of apertures 302 which align the apertures 305 of gasket 304 and apertures located on an indented portion 301 of the underside of stair plug 306. The aligned apertures 302, 305 and the apertures of stair plug 306 are adapted to receive bolts or screws to secure stair plug 306 and gasket 304 to stair plug support structure 303.

Referring to FIGS. 8, 9 and 10, a pair of deflagration vent support frames 254 and their associated deflagration vents 256 are incorporated in rear wall 239 of warehouse modular storage unit 230. There is also a pair of deflagration vent support frames 248 and their associated deflagration vents 252 incorporated in interior wall 250 of warehouse modular storage unit 230.

Deflagration vents 252 and 256 will generally burst open when pressure is applied to the vents 252 and 256 as the result of an accidental vapor or gas explosion which occurs in the interior portion 269 of warehouse modular storage unit 230. For example, a hazardous chemical may be stored in the interior 269 of unit 230, a gas leak may occur from a rupture in a stored container and an electrical spark could then ignite the gaseous fumes resulting in an explosion in the interior portion of unit 230. The pressure generated from the explosion causes the vents 252 and 256 to burst open releasing combustion waves, toxic gases, etc. into the atmosphere.

Referring to FIGS. 8, 9, 11 and 18, the rectangular shaped framework or support structure (illustrated in FIG. 11) for units 230 and 410-420 is similar to the support structure of the modular mobile safety structure disclosed in U.S. Pat. No. 5,735,639 and the mobile safety structure illustrated in U.S. Pat. No. 5,511,908. For example, the right side wall structure 290 of unit 230 is similar to the right side wall structure of the mobile safety structures of U.S. Pat. Nos. 5,511,639 and 5,735,639 except for the addition of door frame 240. In a like manner, the base assembly structure 280 and the roof assembly structure 310 are similar to the base assembly and roof assembly structures of the mobile safety structures of U.S. Pat. Nos. 5,511,639 and 5,735,639.

Although not illustrated, the outer walls 234, 238, 239 and 250 and the roof 232 of warehouse modular storage unit 230 provide for a strong structural enclosure by using interior and outer surface steel panels supported by the generally rectangular shaped tubular steel framework (illustrated in FIG. 11) for each outer wall 234, 238, 239 and 250 and the roof 232 of the modular storage unit 230. There is sandwiched between the interior and outer surface steel panels of each wall a pair of gypsum boards and R-19 insulation. The insulation allows the user of mobile modular warehouse structure to adapt the structure for use under varying climatic conditions, while the gypsum board provides the structure with at least a four hour fire rating. Wall 250 may be fabricated in a like manner to provide for a four hour fire rating.

Referring now to FIGS. 1, 7A and 7B, each deflagration vent 48, 54, 248 and 254 comprises a steel mesh 180 which is located, for example, on the interior side of the right side wall 34 of unit 30. Steel mesh 180, in turn, prevents a user of unit 30 from inadvertently disrupting through the deflagration vents 52 on the right side wall 34 of unit 30. Sandwiched between steel mesh 180 and the exterior surface 186 of each deflagration vent 48, 54, 248 and 254 is an insulation material 184 which is adjacent to surface 186 and a void 181 which is adapted to receive a pair of fire dampers for use in the preferred embodiment of the mobile modular warehouse structure comprising the present invention.

Referring to FIGS. 8 and 9, there is also a pair of exhaust vents 261 and 262 incorporated in the rear wall 239 of unit 230, and a pair of exhaust vents 242 and 244 incorporated in the wall 250 of unit 230 Exhaust vents 261 and 262 as well as exhaust vents 242 and 244 are used to expel contaminated air and fumes from airborne contaminants within the interior portion 269 of unit 230.

The base assembly 236 of warehouse modular storage unit 230 has a four elongated slots 251, 253, 255 and 257 which run the width of unit 230. The pair of slots 253 and 255 are positioned about the center of base assembly 236 and are positioned to receive the forks of a fork lift truck (not illustrated). Similarly, the pair of slots 251 and 257 are also positioned about the center of base assembly 236 and are positioned to receive the forks of a larger fork lift truck (not illustrated). Placing the pair of slots 253 and 255 as well as the pair of slots 251 and 257 about the center point of unit 230 insures that a balanced load occurs on the forks of a fork lift truck when the fork lift truck moves unit 230 from a first location to a second location.

Referring to FIGS. 5 and 8, base assembly 236 of warehouse modular storage unit 230 includes four ISO corner fittings/wheel support assembles 249 with one corner fitting 249 being positioned at each corner of base assembly 236. Each corner fitting 249 may receive a swivel wheel container caster 114 (FIG. 5) which, when secured to unit 230 allows unit 230 to be moved from one location to another location within, for example, a warehouse.

The roof assembly 232 of warehouse modular storage unit 230 includes four ISO corner fittings 259 with one corner fitting 259 being positioned at each corner of roof assembly 232. Each corner fitting 259 may receive a container lifting lug/eyelet 104 (FIG. 5) which allows a cable (not illustrated) to be attached thereto. When cables are attached to the lifting lugs 104 at each corner of unit 230, a crane (not illustrated) may be used to remove unit 230 from a fixed location and load unit 230 on a flatbed trailer for transportation to a new contamination site. A truck having the flatbed trailer attached thereto is used to transport unit 230 to the new contamination site where unit 230 will be used to clean up the site.

In addition, the four corner fittings 249 and the four corner fittings 259 of each warehouse modular storage unit may receive twistlock stackers 116 which allows one warehouse modular storage unit to be stacked on top of and secured to another warehouse modular storage unit. Thus, for example, in FIGS. 18 and 19 four twistlock stackers are used to secure warehouse modular storage unit 416 to warehouse modular storage unit 410 after the units 410 and 416 are stacked in the manner shown in FIG. 19.

Similarly, the four corner fittings 103 of unit 30 (FIG. 5) may receive twistlock stackers 116 which allows warehouse modular storage unit 230 to be stacked on top of and secured to control point modular storage unit 30.

Referring to FIG. 10, shelving 266 is provided for storage of hazmat containers stored within the interior 269 of unit 230. There is also a pair of florescent light fixtures 264 located in the interior portion 269 of unit 230 for providing illumination to the interior portion 269 of unit 230. Mounted on the interior of right side wall 234 is a light switch 270 for activating florescent light fixtures 264, a manual pull box 188 for fire suppression system activation and a thermostat 268 for setting and monitoring the temperature within the interior 269 of unit 230. Mounted on rear wall 239 of unit 230 is a receptacle 273. There is also a one ton hoist 272 included within the interior 269 of unit 230 which may used to move 55 gallon drums or other containers of hazardous materials stored in unit 230.

Figure 11:
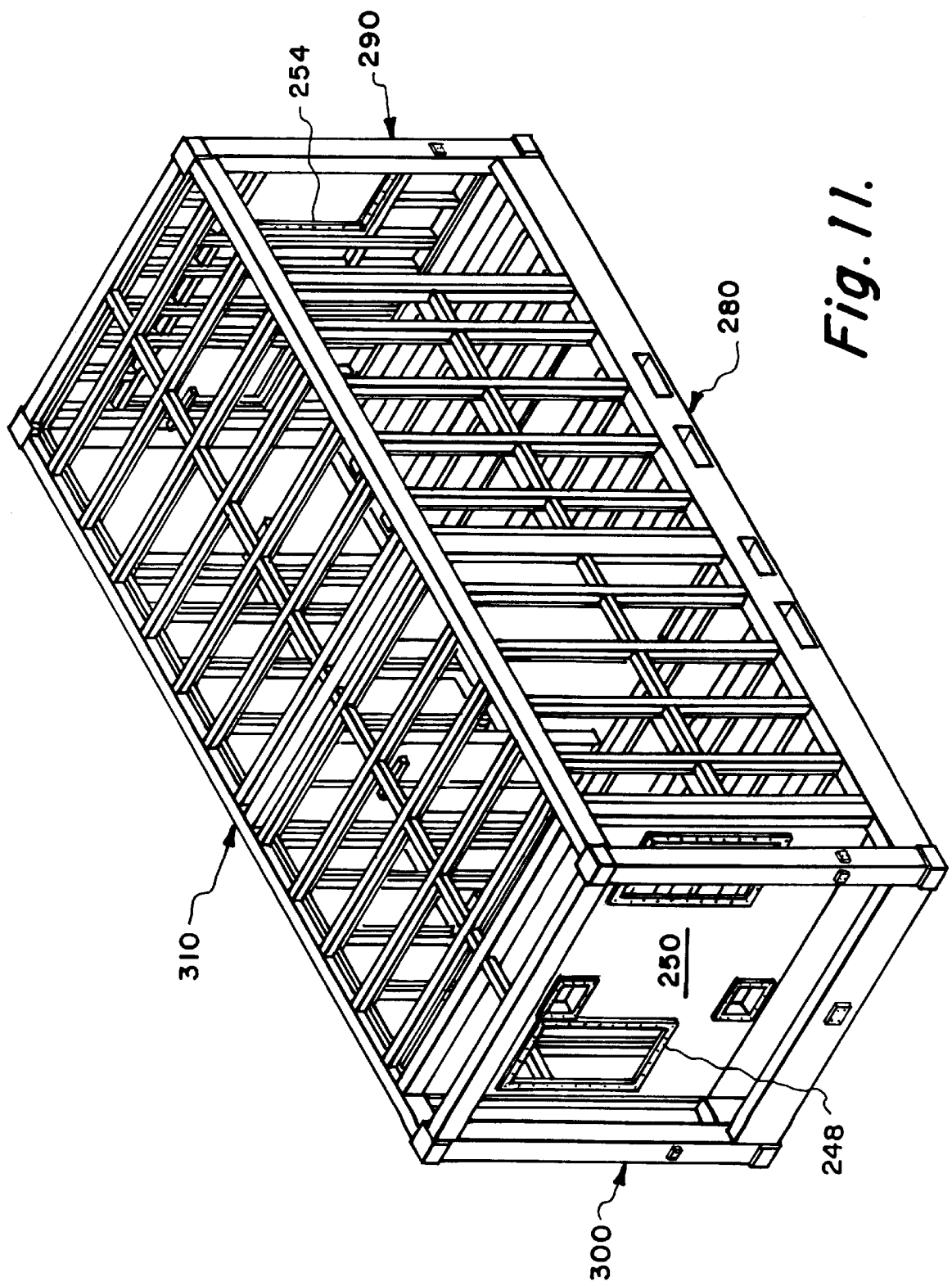
FIG. 11 is an isometric view of the framework for the warehouse modular storage unit of FIG. 9.

Referring to FIGS. 10 and 11, the forward portion of warehouse modular storage unit 230 has a machinery room or compartment 237 which is enclosed by wall 250 and the front portion of right side wall 234 and left side wall 238. Machinery compartment 237 includes an air conditioner duct for cooling and heating the interior 269 of unit 230. Machinery compartment 237 also include a 240/220/110 volt electrical distribution system, a lighting contactor, an electrical panel board, a 120 volt receptacle and a bell which comprises the electrical control and power distribution system for unit 230. A fire suppression controller and fire suppression tank are located within compartment 237 for use in fighting chemical fires which may occur within unit 230. Unit 230 also has an intermediate wall 289 which may have a door installed to provide for segregation of stored hazmat materials. There is also provided separate heat and air conditioning inlets and exhaust for separated interior 269 of unit 230.

Referring to FIGS. 1, 2, 8, 9, 14, 15, 16 and 18, the door seal, designated generally by numeral 402, for door 72 of unit 30 and door 241 of unit 410 is shown in section in FIGS. 14 and 15. Door seal 402 includes a neoprene gasket 314, a centrally located support member 312 and a neoprene gasket 315. There is positioned between members 312 and 317 as well as between members 312 and 315 a layer of neoprene 314. Member 312 is secured to doorjamb 73 by welded nuts 317 with bolts, lockwashers and flatwashers 316.

Figure 17:
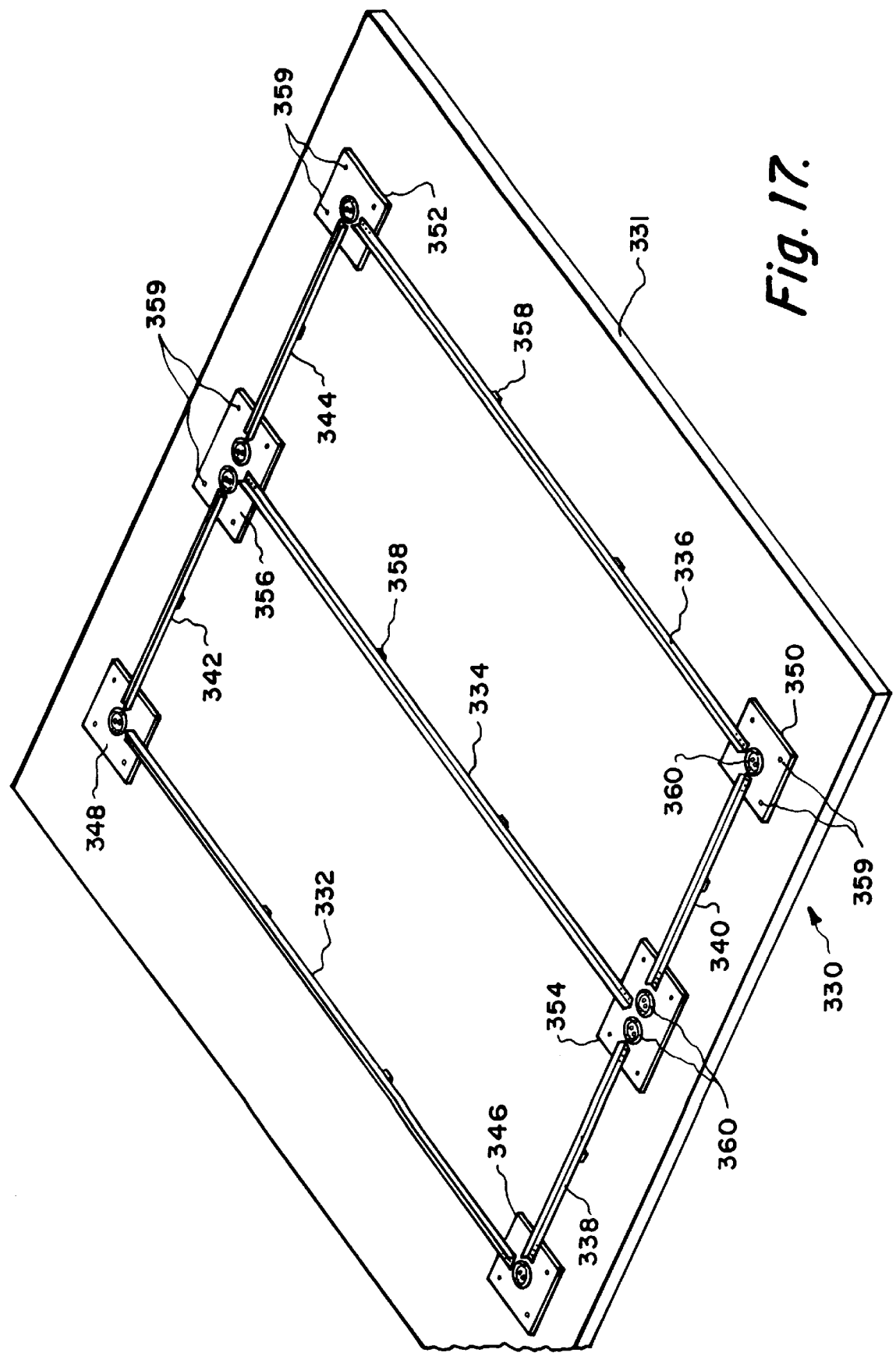
FIG. 17 is a perspective view illustrating the base plate assembly of the present invention which is used to mount the control point modular storage unit of FIG. 1 and the warehouse modular storage unit of FIG. 9 thereon.

Referring to FIGS. 5, 17 and 18, there is shown in FIG. 17, a mounting and alignment structure 330 adapted for mounting thereon and aligning (1) a control point modular storage unit 30 and a warehouse modular storage unit 410, or (2) a pair of warehouse modular storage units 410. If there is a requirement to form a mobile modular warehouse structure such as the warehouse structure 440 illustrated in FIG. 20 then four mounting and alignment structures 330 are positioned adjacent one another to form the mounting and alignment base for warehouse structure 440 of FIG. 20.

Mounting and alignment structure 330 has a generally rectangular shaped base pad 331 fabricated from concrete. Mounted on base pad 331 are four corner mounting pads 346, 348, 350 and 352 with one mounting pad 346, 348, 350 or 352 being positioned in proximity to each corner of base pad 331. Mounting and alignment structure 330 also has two centrally located mounting pads 354 and 356. Mounting pad 354 is in alignment with mounting pads 346 and 350, mounting pad 356 is in alignment with mounting pads 348 and 352. Studs 359 cast in base pad 331 are used to the four corner mounting pads 346, 348, 350 and 352 and the two centrally located mounting pads 354 and 356 to base pad 331.

Each of the four corner mounting pads 346, 348, 350 and 352 has a deck socket 360 mounted on its top surface, while each of the two centrally located mounting pads 354 and 356 has a pair of deck sockets 360 mounted on its top surface. The deck sockets 360 of structure 330 are designed to receive the twistlock connectors 116 (FIG. 5) for control point modular storage unit 30 as well as the twistlock stackers 16 for warehouse modular storage unit 410 thereby providing a means for securing units 30 and 410 to mounting and alignment structure 330.

Mounting and alignment structure 330 also has three elongated alignment members 332, 334 and 336 and four module end alignment members 338, 340, 342 and 344. Each of the three elongated alignment members 332, 334 and 336 has one end connected to an associated one of the mounting pads 348, 356 or 352 and its opposite end connected to an associated one of the mounting pads 346, 354 or 350.

Alignment member 338 has one end connected to mounting pad 346 and its opposite end connected to mounting pad 354; alignment member 340 has one end connected to mounting pad 350 and its opposite end connected to mounting pad 354; alignment member 342 has one end connected to mounting pad 348 and its opposite end connected to mounting pad 356; and alignment member 344 has one end connected to mounting pad 352 and its opposite end connected to mounting pad 356.

Each of the alignment members 332, 334, 336, 338, 340, 342 and 344 of mounting and alignment structure 330 is used to align the sides and ends of control point modular storage unit 30 and warehouse modular storage unit 410 with structure 330 to allow for easy assembly of the mobile modular warehouse structure 430 of FIGS. 18 and 19 or the mobile modular warehouse structure 440 of FIG. 20. Spacer pads 358 are placed between each of the alignment members 332, 334, 336, 338, 340, 342 and 344 of mounting and alignment structure 330 and base pad 331.

From the foregoing, it may readily be seen that the present invention comprises a new, unique and exceedingly useful mobile modular warehouse structure for the containment and handling of hazardous materials which constitutes a considerable improvement over the known prior art. Obviously, many modifications and variations of the present invention are possible in light of the above teachings. It is therefore to be understood that within the scope of the appended claims the invention may be practiced otherwise than as specifically described.

What is claimed is:

1. A mobile modular warehouse structure for storing containers of hazardous materials and providing for a containment of any spills and leaks of said hazardous materials from said containers, said mobile modular warehouse structure comprising:

(a) a control point modular storage unit and a warehouse modular storage unit, said control point modular storage unit being positioned adjacent said warehouse modular storage unit and aligned therewith to form a tandem arrangement of modular storage units for treatment and handling of said hazardous materials, said control point modular storage unit and said warehouse modular storage unit each comprising:

(i) a rectangular shaped base assembly;

(ii) inner and outer side walls extending perpendicularly upward from said base assembly;

(iii) a rear wall extending perpendicularly upward from said base assembly;

(iv) an interior wall extending perpendicularly upward from said base assembly, said interior wall being positioned near the front of said control point modular storage unit and said warehouse modular storage unit, said inner and outer side walls being secured to a separate one of the opposed ends of said rear wall and said interior wall to form an interior portion of said control point modular storage unit and said warehouse modular storage unit that is defined between said interior wall and said rear wall and between said inner and outer side walls and a machinery compartment that is defined from said interior wall to the front end of said control point modular storage unit and said warehouse modular storage unit;

(v) a rectangular shaped roof assembly mounted atop said inner and outer side walls, said rear wall and said interior wall and extending horizontally over the interior portion and the machinery compartment of said control point modular storage unit and said warehouse modular storage unit;

(vii) each of the inner side walls of said control point modular storage unit and said warehouse modular storage unit having a door frame which includes a door located at the rear end thereof, the door frame of the inner side wall of said control point modular storage unit being aligned with the door frame of the inner side wall of said warehouse modular storage unit to allow a user of said mobile modular warehouse unit to access said warehouse modular storage unit from said control point modular storage unit; and (viii) the base assembly of said control point modular storage unit and said warehouse modular storage unit including a substantially rectangular open secondary containment pan that is leakproof, said secondary containment pan receiving spillage and leakage of said hazardous materials from said containers that are housed within said control point modular storage unit and said warehouse modular storage unit;

(b) a bellows having one end removably coupled to the inner wall of said control point modular storage unit at the door frame of the inner wall of said control point modular storage unit and the opposite end removably coupled to the inner wall of said warehouse modular storage unit at the door frame of the inner wall of said warehouse modular storage unit;

(c) the outer side wall of said control point module storage unit having at least one door frame which includes a door to allow access to the interior portion of said control point modular storage unit and said warehouse modular storage unit;

(d) the rear wall and the interior wall of said warehouse modular storage unit each having a pair of deflagration vents which burst open when pressure is applied to said deflagration vents resulting from an accidental gas explosion occurring in the interior portion of said warehouse modular storage unit;

(e) the rear wall and the outer side wall of said control point modular storage unit each having a pair of deflagration vents which burst open when pressure is applied to said deflagration vents resulting from an accidental gas explosion occurring in the interior portion of said control point modular storage unit; and (f) a mounting and alignment structure having said control point modular storage unit and said warehouse modular storage unit mounted thereon, said mounting and alignment structure aligning said control point modular storage unit with said warehouse modular storage unit.

2. The mobile modular warehouse structure of claim 1 wherein said machinery compartment of said control point modular storage unit and said warehouse modular storage unit includes an electrical control and power distribution system and said machinery compartment of said control point modular storage unit includes an air conditioner.

3. The mobile modular warehouse structure of claim 1 wherein said control point modular storage unit and said warehouse modular storage unit each has four swivel wheel container casters, each of said four swivel wheel container casters of said control point modular storage unit and said warehouse modular storage unit being coupled to a separate one of four corner fittings integral with said base assembly of said control point modular storage unit and said warehouse modular storage unit, said four swivel wheel container casters of said control point modular storage unit and said warehouse modular storage unit allowing a movement of said control point modular storage unit and said warehouse modular storage unit from a first location to a second location.

4. The mobile modular warehouse structure of claim 3 wherein said base assembly of said control point modular storage unit and said base assembly of said warehouse modular storage unit has a tow bar plate and a pintle hook attached to the front end thereof, said tow bar plate and said pintle hook of said control point modular storage unit being adapted to secure a first tow bar to said control point modular storage unit allowing said control point modular storage unit to be towed by a tow truck from said first location to said second location and said tow bar plate and said pintle hook of said warehouse modular storage unit being adapted to secure a second tow bar to said warehouse modular storage unit allowing said warehouse modular storage unit to be towed by said tow truck from said first location to said second location.

5. The mobile modular warehouse structure of claim 1 further comprising a pair of machinery room access doors pivotally mounted to the front end of control point modular storage unit which allow the user of said mobile modular warehouse structure to access said machinery compartment of said control point modular storage unit.

6. The mobile modular warehouse structure of claim 1 wherein said mounting and alignment structure comprises:

a generally rectangular shaped base pad;

four corner mounting pads mounted on said base pad, one of said four mounting pads being positioned in proximity to each corner of said base pad, each of said four corner mounting pads having a deck socket mounted on a top surface thereof;

first and second centrally located mounting pads mounted said base pad, each of said first and second centrally located mounting pads being aligned with a pair of said four corner mounting pads, each of said first and second centrally located mounting pads having a pair of deck sockets mounted on a top surface thereof;

three elongated alignment members, first and second of said three elongated alignment members having one end thereof connected to an associated one of said four corner mounting pads and an opposite end thereof connected to another associated one of said four mounting pads, a third of said three elongated alignment members having one end thereof connected to one of said two centrally located mounting pads and an opposite end thereof connected to the other of said two centrally located mounting pads, said three elongated alignment members being substantially parallel to one another; and four module end alignment members, each of said four module end alignment members having one end thereof connected to one of said four corner mounting pads and an opposite end thereof connected to one of said first and second centrally located mounting pads.

7. A mobile modular warehouse structure for storing containers of hazardous materials and providing for a containment of any spills and leaks of said hazardous materials from said containers, said mobile modular warehouse structure comprising:

(a) a control point modular storage unit and a warehouse modular storage unit, said warehouse modular storage unit being positioned on top of said control point modular storage unit and secured thereto to form a stacked arrangement of modular storage units for treatment and handling of said hazardous materials, said control point modular storage unit and said warehouse modular storage unit each comprising:

(i) a rectangular shaped base assembly having a first group of four corner fittings, one of the first group of four corner fittings of said rectangular shaped base assembly being disposed at each corner of said rectangular shaped base assembly;

(ii) first and second side walls extending perpendicularly upward from said base assembly;

(iii) a rear wall extending perpendicularly upward from said base assembly;

(iv) an interior wall extending perpendicularly upward from said base assembly, said interior wall being positioned near the front of said control point modular storage unit and said warehouse modular storage unit, said first and second side walls being secured to a separate one of the opposed ends of said rear wall and said interior wall to form an interior portion of said control point modular storage unit and said warehouse modular storage unit that is defined between said interior wall and said rear wall and between said first and second side walls and a machinery compartment that is defined from said interior wall to the front end of said control point modular storage unit and said warehouse modular storage unit;

(v) a rectangular shaped roof assembly mounted atop said first and second side walls, said rear wall and said interior wall and extending horizontally over the interior portion and the machinery compartment of said control point modular storage unit and said warehouse modular storage unit, said rectangular shaped roof assembly having a second group of four corner fittings, one of the second group of four corner fittings of said rectangular shaped roof assembly being disposed at each corner of said rectangular shaped roof assembly; and (vi) the base assembly of said control point modular storage unit and said warehouse modular storage unit including a substantially rectangular open secondary containment pan that is leakproof, said secondary containment pan receiving spillage and leakage of said hazardous materials from said containers that are housed within said control point modular storage unit and said warehouse modular storage unit;

(b) four twistlock stackers, each of said four twistlock stackers coupling one of said second group of four corner fittings of said control point modular storage unit to an aligned one of said first group of four corner fittings of said warehouse modular storage unit to secure said warehouse modular storage unit to said control point modular storage unit;

(c) a rectangular shaped stair support frame located in the roof assembly of said control point modular storage unit and a flight of steps affixed to said rectangular shaped ladder support frame; and (d) a rectangular shaped access wall affixed to the rectangular shaped base assembly of said warehouse modular storage unit, said rectangular shaped access wall being aligned with an opening within the rectangular shaped base assembly of said warehouse modular storage unit, said rectangular shaped access wall being aligned with and affixed to said rectangular shaped stair support frame to form a passageway between said control point modular storage unit and said warehouse modular storage unit;

(e) the second side wall of said control point module storage unit having at least one door frame which includes a door to allow access to the interior portion of said control point modular storage unit and said warehouse modular storage unit;

(f) the rear wall and the interior wall of said warehouse modular storage unit each having a pair of deflagration vents which burst open when pressure is applied to said deflagration vents resulting from an accidental gas explosion occurring in the interior portion of said warehouse modular storage unit;

(g) the rear wall and the second side wall of said control point modular storage unit each having a pair of deflagration vents which burst open when pressure is applied to said deflagration vents resulting from an accidental gas explosion occurring in the interior portion of said control point modular storage unit; and (h) a mounting and alignment structure having said control point modular storage unit mounted thereon.

8. The mobile modular warehouse structure of claim 7 wherein said machinery compartment of said control point modular storage unit and said warehouse modular storage unit includes an electrical control and power distribution system and said machinery compartment of said control point modular storage unit includes an air conditioner.

9. The mobile modular warehouse structure of claim 7 wherein said control point modular storage unit and said warehouse modular storage unit each has four swivel wheel container casters, each of said four swivel wheel container casters of said control point modular storage unit and said warehouse modular storage unit being coupled to one of said first group of four corner fittings of said base assembly of said control point modular storage unit and said warehouse modular storage unit, said four swivel wheel container casters of said control point modular storage unit and said warehouse modular storage unit allowing a movement of said control point modular storage unit and said warehouse modular storage unit from a first location to a second location.

10. The mobile modular warehouse structure of claim 9 wherein said base assembly of said control point modular storage unit and said base assembly of said warehouse modular storage unit has a tow bar plate and a pintle hook attached to the front end thereof, said tow bar plate and said pintle hook of said control point modular storage unit being adapted to secure a first tow bar to said control point modular storage unit allowing said control point modular storage unit to be towed by a tow truck from said first location to said second location and said tow bar plate and said pintle hook of said warehouse modular storage unit being adapted to secure a second tow bar to said warehouse modular storage unit allowing said warehouse modular storage unit to be towed by said tow truck from said first location to said second location.

11. The mobile modular warehouse structure of claim 7 further comprising a pair of machinery room access doors pivotally mounted to the front end of control point modular storage unit which allow the user of said mobile modular warehouse structure to access said machinery compartment of said control point modular storage unit.

12. The mobile modular warehouse structure of claim 7 wherein said mounting and alignment structure comprises:

a generally rectangular shaped base pad;

four corner mounting pads mounted on said base pad, one of said four mounting pads being positioned in proximity to each corner of said base pad, each of said four corner mounting pads having a deck socket mounted on a top surface thereof;

first and second centrally located mounting pads mounted said base pad, each of said first and second centrally located mounting pads being aligned with a pair of said four corner mounting pads, each of said first and second centrally located mounting pads having a pair of deck sockets mounted on a top surface thereof;

three elongated alignment members, first and second of said three elongated alignment members having one end thereof connected to an associated one of said four corner mounting pads and an opposite end thereof connected to another associated one of said four mounting pads, a third of said three elongated alignment members having one end thereof connected to one of said two centrally located mounting pads and an opposite end thereof connected to the other of said two centrally located mounting pads, said three elongated alignment members being substantially parallel to one another; and four module end alignment members, each of said four module end alignment members having one end thereof connected to one of said four corner mounting pads and an opposite end thereof connected to one of said first and second centrally located mounting pads.

13. A mobile modular warehouse structure for storing containers of hazardous materials and providing for a containment of any spills and leaks of said hazardous materials from said containers, said mobile modular warehouse structure comprising:

(a) a control point modular storage unit and first, second and third warehouse modular storage units, said first warehouse modular storage unit being positioned on top of said control point modular storage unit and secured thereto, said control point modular storage unit being positioned adjacent said second warehouse modular storage unit and aligned therewith and said third warehouse modular storage unit being positioned on top of said second warehouse modular storage unit and secured thereto to form said mobile modular warehouse structure for treatment and handling of said hazardous materials, said control point modular storage unit and said first, second and third warehouse modular storage units each comprising:

(i) a rectangular shaped base assembly having a first group of four corner fittings, one of the first group of four corner fittings of said rectangular shaped base assembly being disposed at each corner of said rectangular shaped base assembly;

(ii) inner and outer side walls extending perpendicularly upward from said base assembly;

(iii) a rear wall extending perpendicularly upward from said base assembly;

(iv) an interior wall extending perpendicularly upward from said base assembly, said interior wall being positioned near the front of said control point modular storage unit and said first, second and third warehouse modular storage units, said inner and outer side walls being secured to a separate one of the opposed ends of said rear wall and said interior wall to form an interior portion of said control point modular storage unit and said first, second and third warehouse modular storage units that is defined between said interior wall and said rear wall and between said inner and outer side walls and a machinery compartment that is defined from said interior wall to the front end of said control point modular storage unit and said first, second and third warehouse modular storage units;

(v) a rectangular shaped roof assembly mounted atop said inner and outer side walls, said rear wall and said interior wall and extending horizontally over the interior portion and the machinery compartment of said control point modular storage unit and said first, second and third warehouse modular storage units, said rectangular shaped roof assembly having a second group of four corner fittings, one of the second group of four corner fittings of said rectangular shaped roof assembly being disposed at each corner of said rectangular shaped roof assembly;

(vi) each of the inner side walls of said control point modular storage unit and said first, second and third warehouse modular storage unit having a door frame which includes a door located at the rear end thereof, the door frame of the inner side wall of said control point modular storage unit being aligned with the door frame of the inner side wall of said second warehouse modular storage unit and the door frame of the inner side wall of said first warehouse modular storage unit being aligned with the door frame of the inner side wall of said third warehouse modular storage unit to allow a user of said mobile modular warehouse structure to access said second warehouse modular storage unit from said control point modular storage unit and said third warehouse modular storage unit from said first warehouse modular storage unit; and (vi) the base assembly of said control point modular storage unit and said first, second and third warehouse modular storage units including a substantially rectangular open secondary containment pan that is leakproof, said secondary containment pan receiving spillage and leakage of said hazardous materials from said containers that are housed within said control point modular storage unit and said first, second and third warehouse modular storage units;

(b) a first group of four twistlock stackers, each of said first group of four twistlock stackers coupling one of said second group of four corner fittings of said control point modular storage unit to an aligned one of said first group of four corner fittings of said first warehouse modular storage unit to secure said first warehouse modular storage unit to said control point modular storage unit;

(c) a second group of four twistlock stackers, each of said second group of four twistlock stackers coupling one of said second group of four corner fittings of said second warehouse modular storage unit to an aligned one of said first group of four corner fittings of said third warehouse modular storage unit to secure said third warehouse modular storage unit to said second warehouse modular storage unit;

(d) a first bellows having one end removably coupled to the inner wall of said control point modular storage unit at the door frame of the inner wall of said control point modular storage unit and the opposite end removably coupled to the inner wall of said second warehouse modular storage unit at the door frame of the inner wall of said second warehouse modular storage unit;

(e) a second bellows having one end removably coupled to the inner wall of said first warehouse modular storage unit at the door frame of the inner wall of said first warehouse modular storage unit and the opposite end removably coupled to the inner wall of said third warehouse modular storage unit at the door frame of the inner wall of said third warehouse modular storage unit;

(f) a rectangular shaped stair support frame located in the roof assembly of said control point modular storage unit and a flight of steps affixed to said rectangular shaped ladder support frame; and (g) a rectangular shaped access wall affixed to the rectangular shaped base assembly of said first warehouse modular storage unit, said rectangular shaped access wall being aligned with an opening within the rectangular shaped base assembly of said first warehouse modular storage unit, said rectangular shaped access wall being aligned with and affixed to said rectangular shaped stair support frame to form a passageway between said control point modular storage unit and said first warehouse modular storage unit;

(h) the outer side wall of said control point module storage unit having at least one door frame which includes a door to allow access to the interior portion of said control point modular storage unit and said first, second and third warehouse modular storage units;

(i) the rear wall and the interior wall of said first, second and third warehouse modular storage units each having a pair of deflagration vents which burst open when pressure is applied to said deflagration vents resulting from an accidental gas explosion occurring in the interior portion of said first, second and third warehouse modular storage units;

(j) the rear wall and the outer side wall of said control point modular storage unit each having a pair of deflagration vents which burst open when pressure is applied to said deflagration vents resulting from an accidental gas explosion occurring in the interior portion of said control point modular storage unit; and (k) a mounting and alignment structure having said control point modular storage unit and said warehouse second modular storage unit mounted thereon, said mounting and alignment structure aligning said control point modular storage unit with said second warehouse modular storage unit.

14. The mobile modular warehouse structure of claim 13 wherein said machinery compartment of said control point modular storage unit and said first, second and third warehouse modular storage units include an electrical control and power distribution system and said machinery compartment of said control point modular storage unit includes an air conditioner.

15. The mobile modular warehouse structure of claim 13 further comprising a pair of machinery room access doors pivotally mounted to the front end of said control point modular storage unit which allow the user of said mobile modular warehouse structure to access said machinery compartment of said control point modular storage unit.

16. The mobile safety structure of claim 13 wherein said mounting and alignment structure comprises:

a generally rectangular shaped base pad;

four corner mounting pads mounted on said base pad, one of said four mounting pads being positioned in proximity to each corner of said base pad, each of said four corner mounting pads having a deck socket mounted on a top surface thereof;

first and second centrally located mounting pads mounted said base pad, each of said first and second centrally located mounting pads being aligned with a pair of said four corner mounting pads, each of said first and second centrally located mounting pads having a pair of deck sockets mounted on a top surface thereof;

three elongated alignment members, first and second of said three elongated alignment members having one end thereof connected to an associated one of said four corner mounting pads and an opposite end thereof connected to another associated one of said four mounting pads, a third of said three elongated alignment members having one end thereof connected to one of said two centrally located mounting pads and an opposite end thereof connected to the other of said two centrally located mounting pads, said three elongated alignment members being substantially parallel to one another; and four module end alignment members, each of said four module end alignment members having one end thereof connected to one of said four corner mounting pads and an opposite end thereof connected to one of said first and second centrally located mounting pads.

17. The mobile modular warehouse structure of claim 13 wherein said control point modular storage unit and said first, second and third warehouse modular storage units each has four swivel wheel container casters, each of said four swivel wheel container casters of said control point modular storage unit and said first, second and third warehouse modular storage units being coupled to one of said first group of four corner fittings of said base assembly of said control point modular storage unit and said first, second and third warehouse modular storage units, said four swivel wheel container casters of said control point modular storage unit and said first, second and third warehouse modular storage units allowing a movement of said control point modular storage unit and said first, second and third warehouse modular storage units from a first location to a second location.

18. The mobile modular warehouse structure of claim 17 wherein said base assembly of said control point modular storage unit and said base assembly of said first, second and third warehouse modular storage units have a tow bar plate and a pintle hook attached to the front end thereof, said tow bar plate and said pintle hook of said control point modular storage unit being adapted to secure a first tow bar to said control point modular storage unit allowing said control point modular storage unit to be towed by a tow truck from said first location to said second location and said tow bar plate and said pintle hook of said first, second and third warehouse modular storage units being adapted to secure second, third and fourth tow bars respectively to said first, second and third warehouse modular storage units allowing said first, second and third warehouse modular storage units to be towed by said tow truck from said first location to said second location.

19. The mobile modular warehouse structure of claim 13 further comprising shelving located within the interior portion of said control point modular storage unit, said shelving being adapted for storage of hazmat containers in the interior portion of said control point modular storage unit.

20. The mobile modular warehouse structure of claim 13 further comprising shelving located within the interior portion of said first, second and third warehouse modular storage units, said shelving being adapted for storage of hazmat containers in the interior portion of said first, second and third warehouse modular storage units.

\* \* \* \* \*